US012625989B2

(12) United States Patent
Peng et al.

(10) Patent No.: US 12,625,989 B2
(45) Date of Patent: May 12, 2026

(54) CONFIGURATION METHOD, DATA INTEGRATION METHOD, APPARATUS, DEVICE, AND STORAGE MEDIUM OF DATA INTEGRATION STRATEGY

(71) Applicant: Beijing Zitiao Network Technology Co., Ltd., Beijing (CN)

(72) Inventors: Xiaoyi Peng, Beijing (CN); Yaoxuan Wang, Beijing (CN); Ying Lian, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 123 days.

(21) Appl. No.: 18/388,790

(22) Filed: Nov. 10, 2023

(65) Prior Publication Data

US 2024/0160763 A1 May 16, 2024

(30) Foreign Application Priority Data

Nov. 11, 2022 (CN) .......................... 202211415828.4

(51) Int. Cl.
*G06F 21/62* (2013.01)

(52) U.S. Cl.
CPC ................................. *G06F 21/6218* (2013.01)

(58) Field of Classification Search
None
See application file for complete search history.

(56) References Cited

U.S. PATENT DOCUMENTS

| | | | |
|---|---|---|---|
| 2002/0091705 A1 | 7/2002 | Mitomi et al. | |
| 2004/0267798 A1* | 12/2004 | Chatterjee | G06F 40/169 |
| | | | 707/999.102 |
| 2012/0173328 A1* | 7/2012 | Rahman | G06Q 30/0277 |
| | | | 705/14.47 |
| 2015/0278764 A1* | 10/2015 | Patil | G06F 16/93 |
| | | | 705/301 |
| 2019/0361847 A1 | 11/2019 | Thomson | |
| 2020/0125540 A1* | 4/2020 | Thatte | G06F 16/211 |
| 2021/0019338 A1* | 1/2021 | Grampurohit | G06F 3/0481 |
| 2021/0034581 A1* | 2/2021 | Boven | G06N 3/09 |

(Continued)

FOREIGN PATENT DOCUMENTS

| | | |
|---|---|---|
| CN | 101655806 A | 2/2010 |
| CN | 104732310 A | 6/2015 |
| CN | 105335900 A | 2/2016 |

(Continued)

OTHER PUBLICATIONS

China Patent Application No. 202211415828.4; Office Action; dated Sep. 29, 2024; 23 pages.

(Continued)

*Primary Examiner* — Brandon Hoffman
(74) *Attorney, Agent, or Firm* — BakerHostetler

(57) ABSTRACT

The disclosure provides a configuration method, data integration method, apparatus, device and storage medium of data integration strategy. The method includes obtaining a data structure of a data source based on an access credential of the data source; and configuring a data structure of an external object for the data structure of the data source, wherein there is a mapping relationship between the data structure of the external object and the data structure of the data source.

19 Claims, 15 Drawing Sheets

A plurality of first data attributes of the data source are displayed based on the data structure of the data source — 401

In response to a selection operation on at least one of a plurality of first data attributes, determining at least one target data attribute of the data source — 402

The second data attribute of the external object is configured for each target data attribute, and there is a corresponding relationship between each target data attribute and the second data attribute — 403

(56) References Cited

U.S. PATENT DOCUMENTS

2021/0200902 A1 * 7/2021 Brannon ............. G06F 21/6263

FOREIGN PATENT DOCUMENTS

| | | | |
|---|---|---|---|
| CN | 105786946 | A | 7/2016 |
| CN | 107066697 | A | 8/2017 |
| CN | 113190517 | A | 7/2021 |
| CN | 114564475 | A | 5/2022 |
| EP | 2365448 | A1 | 9/2011 |
| HK | 1048686 | A1 | 4/2003 |

OTHER PUBLICATIONS

Yang Huiqing; "Study and Application of Data Integration Support for Mashup"; Shandong University of Science and Technology; Dissertation; May 2009; 69 pages (*contains English Abstract see p. 6*).

China Patent Application No. 202211415828.4; Office Action—Notice of Registration; dated Jan. 16, 2025; 5 pages.

* cited by examiner

A data structure of a data source is obtained based on a access credential of the data source ⟿ 101

A data structure of an external object is configured for the data structure of the data source, wherein there is a mapping relationship between the data structure of the external object and the data structure of the data source ⟿ 102

602     600

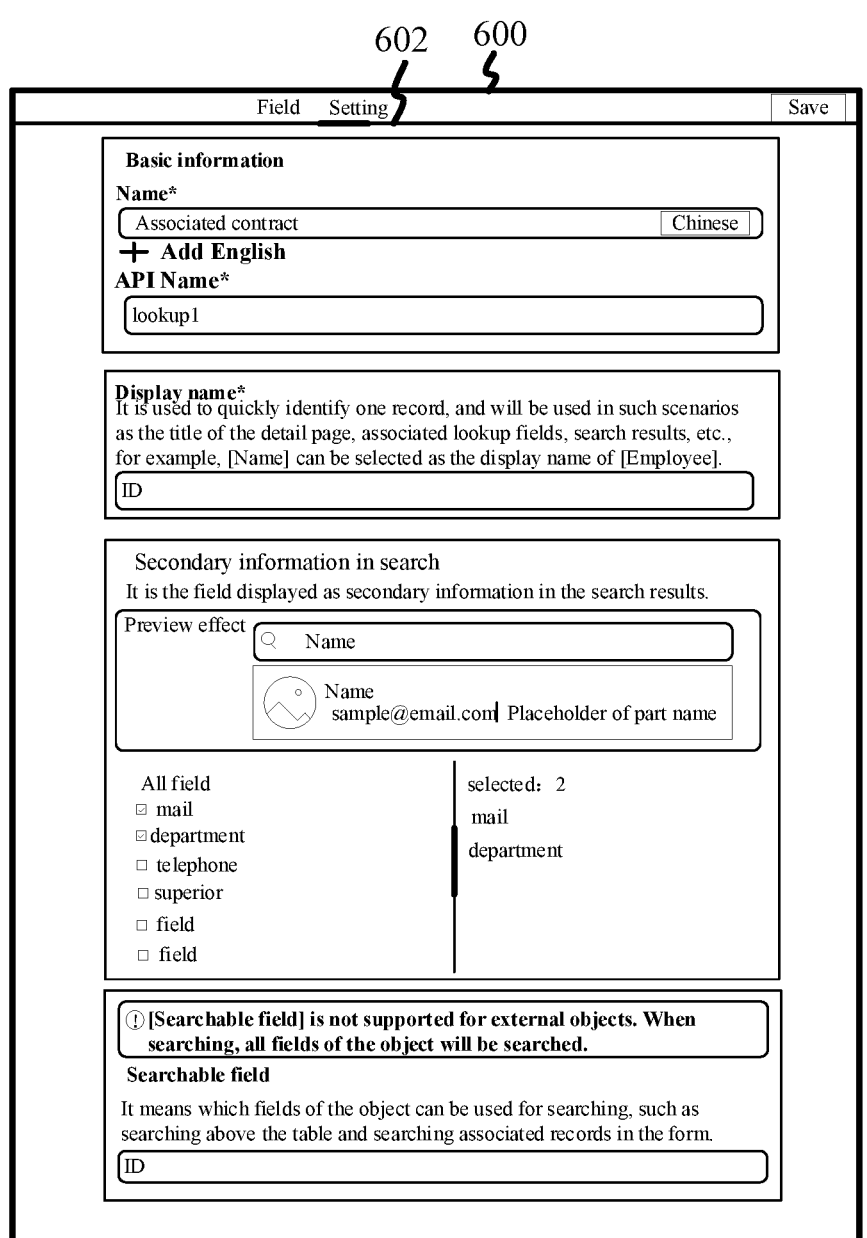

Basic information

Name*

| Associated contract | Chinese |

+ Add English

API Name*

| lookup1 |

Display name*

It is used to quickly identify one record, and will be used in such scenarios as the title of the detail page, associated lookup fields, search results, etc., for example, [Name] can be selected as the display name of [Employee].

| ID |

Secondary information in search

It is the field displayed as secondary information in the search results.

Preview effect
| Q     Name |
| Name
sample@email.com| Placeholder of part name |

All field
☑ mail
☑ department
☐ telephone
☐ superior
☐ field
☐ field selected: 2
mail
department ① [Searchable field] is not supported for external objects. When searching, all fields of the object will be searched.

Searchable field

It means which fields of the object can be used for searching, such as searching above the table and searching associated records in the form.

| ID |

Unable to access this page
The current page uses data without
permission. Please contact the administrator
to modify it.

In response to the deletion operation on the second data attribute mapped
by the first data attribute, whether the second data attribute is referenced
is detected

YES                    802                    NO        803

The reference relationship of the second data attribute
is removed based on the reference relationship
information of the second data attribute The second data attribute mapped to the first data attribute is
deleted

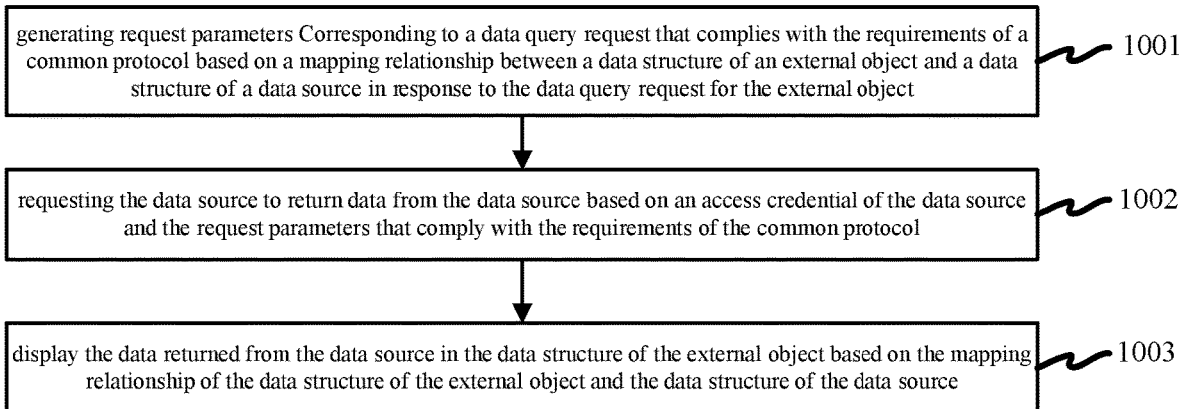

generating request parameters Corresponding to a data query request that complies with the requirements of a common protocol based on a mapping relationship between a data structure of an external object and a data structure of a data source in response to the data query request for the external object — 1001 requesting the data source to return data from the data source based on an access credential of the data source and the request parameters that comply with the requirements of the common protocol — 1002 display the data returned from the data source in the data structure of the external object based on the mapping relationship of the data structure of the external object and the data structure of the data source — 1003

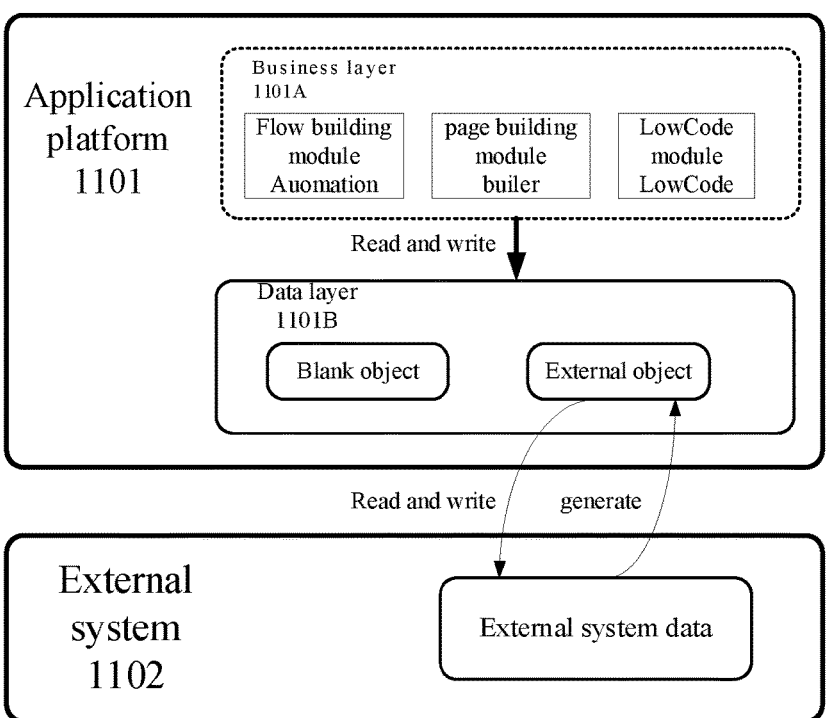

CONFIGURATION METHOD, DATA INTEGRATION METHOD, APPARATUS, DEVICE, AND STORAGE MEDIUM OF DATA INTEGRATION STRATEGY

CROSS REFERENCE TO RELATED APPLICATIONS

This disclosure claims the priority of the Chinese Patent Application filed to the China Patent Office on Nov. 11, 2022, with the application number 202211415828.4 and the invention name of "CONFIGURATION METHOD, DATA INTEGRATION METHOD, APPARATUS, DEVICE AND STORAGE MEDIUM OF DATA INTEGRATION STRAT-EGY", the entire disclosures of which are incorporated by reference as part of the disclosure of this application.

TECHNICAL FIELD

The disclosure relates to the technical field of the Internet, in particular to a configuration method, data integration method, apparatus, device, and storage medium of data integration strategy.

BACKGROUND

Developers may need to consume data from other systems when setting up data management systems. In the related technology, the interactive interface between the data management system and other systems may be agreed in advance, and data interaction may be performed through network communication or other means. However, the versatility of this data interaction scheme is relatively poor, if other systems that interact data with the data management system need to be changed, the interface needs to be redesigned and developed, resulting in a high cost of virtual integration.

SUMMARY

According to one aspect of the present disclosure, a configuration method for a data integration strategy is provided, comprising: obtaining a data structure of a data source based on an access credential of the data source; and configuring a data structure of an external object for the data structure of the data source. There is a mapping relationship between the data structure of the external object and the data structure of the data source.

According to another aspect of the present disclosure, a data integration method is provided, comprising: generating request parameters of a data query request that comply with requirements of a common protocol based on a mapping relationship between a data structure of an external object and a data structure of a data source in response to the data query request for the external object; requesting the data source to return data from the data source based on an access credential of the data source and the request parameters that comply with the requirements of the common protocol; and displaying the data returned from the data source in the data structure of the external object based on the mapping relationship between the data structure of the external object and the data structure of the data source.

According to another aspect of the present disclosure, a configuration apparatus for a data integration strategy is provided, comprising: an obtaining module, used for obtaining a data structure of a data source based on an access credential of the data source; and a configuring module, used for configuring a data structure of an external object for the data structure of the data source. There is a mapping relationship between the data structure of the external object and the data structure of the data source.

According to another aspect of the present disclosure, a data integration apparatus is provided, comprising: a generating module, used for generating request parameters of a data query request that comply with requirements of a common protocol based on a mapping relationship between a data structure of an external object and a data structure of a data source in response to the data query request for the external object; a communicating module, used for requesting the data source to return data from the data source based on an access credential of the data source and the request parameters that comply with the requirements of the common protocol; a displaying module, used for displaying the data returned from the data source in the data structure of the external object based on the mapping relationship of the data structure of the external object and the data structure of the data source.

According to another aspect of the present disclosure, an electronic device is provided, comprising: a processor and a memory for storing programs. The programs comprise instructions that, when executed by the processor, cause the processor to perform the methods according to the embodiments of the present disclosure.

In one or more technical solutions provided in the embodiments of the present disclosure, when a data structure of a data source is obtained based on an access credential of the data source, the system where the data source is located may be entered through the access credential under the condition of satisfying the requirements of the data source for access permission, thus, the data structure of the data source may be read from the data source utilizing the common data interface. On this basis, a data structure of an external object is configured for the data structure of the data source, such that there is a mapping relationship between the data structure of the external object and the data structure of the data source. At this time, when using external objects to consume data from the data source, the data of the data source displayed in accordance with the data structure of the external object is obtained through the mapping relationship between the data structure of the external object and the data structure of the data source according to the access credential, taking the common data interface as an interactive interface, in response to a data query request, so as to consume the data of source data normally. It may be understood that the method of the exemplary embodiments of the present disclosure does not need to design and develop a data interface specific to the data source, but directly integrates with and accesses the virtual data through the common data interface. Therefore, the method of the exemplary embodiment of the present disclosure may reduce the data management cost and maintenance cost when satisfying the requirements of the data source for access permission, thereby facilitating data communication and data consumption and reducing the virtual integration cost.

BRIEF DESCRIPTION OF DRAWINGS

Further details, features, and advantages of the present disclosure are disclosed in the following description of exemplary embodiments taken in conjunction with the accompanying drawings, in which:

FIG. 6B shows a schematic diagram of an object editing interface in a display state of a second editing sub-interface of an exemplary embodiment of the present disclosure;

FIG. 7 shows a schematic diagram of an error page of an exemplary embodiment of the present disclosure;

FIG. 8 shows a schematic flowchart of a second data attribute deletion of an exemplary embodiment of the present disclosure;

FIG. 10 shows a schematic flowchart of a data integration method of an exemplary embodiment of the present disclosure;

FIG. 11 shows a schematic diagram of a data integration architecture of an exemplary embodiment of the present disclosure;

FIG. 15 shows a structural block diagram of an exemplary electronic device that may be used to implement an embodiment of the present disclosure.

DETAILED DESCRIPTION

Figure 1:
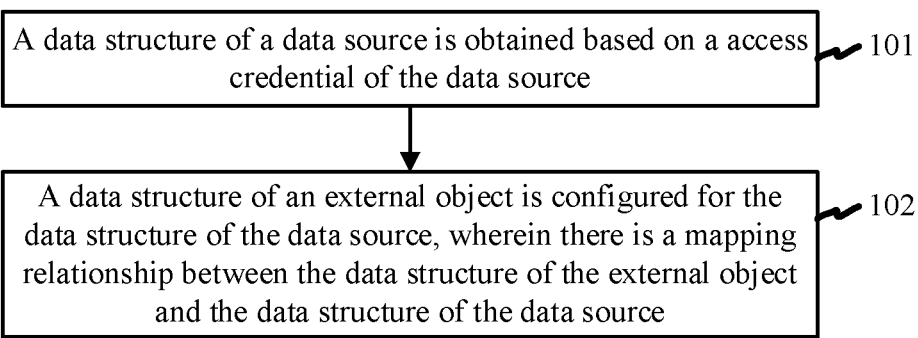
FIG. 1 shows a schematic flowchart of a configuration method of a data integration strategy of an exemplary embodiment of the present disclosure.

Embodiments of the present disclosure will be described in more detail below with reference to the accompanying drawings. Although some embodiments of the present disclosure are shown in the drawings, it should be understood that the present disclosure may be embodied in various forms and should not be construed as limited to the embodiments set forth herein, but rather, these embodiments are provided for a more thorough and complete understanding of the present disclosure. It should be understood that the drawings and embodiments of the present disclosure are only used for exemplary functions, and are not used for limiting the protection scope of the present disclosure.

It should be understood that the steps described in the method implementations of the present disclosure may be performed in different orders and parallel. Furthermore, the method implementations may include additional steps and/or omit to perform the illustrated steps. The scope of the present disclosure is not limited in this respect.

As used herein, the term "comprising" and its variants are open-ended comprising, that is, "comprising but not limited to". The term "based on" is "at least partially based on". The term "one embodiment" means "at least one embodiment"; the term "another embodiment" means "at least one other embodiment"; the term "some embodiments" means "at least some embodiments". Related definitions of other terms will be given in the following description. It should be noted that the concepts of "first" and "second" mentioned in this disclosure are only used for distinguishing different apparatus, modules, or units, and are not used for limiting the order or interdependence of the functions performed by these apparatus, modules, or units.

It should be noted that the modifications of "one" and "a plurality of" mentioned in this disclosure are schematic rather than limiting, and those skilled in the art should understand that unless the context clearly indicates otherwise, they should be understood as "one or more".

Names of messages or information exchanged among multiple apparatus in the implementations of the present disclosure are only used for illustrative purposes and are not used for limiting the scope of these messages or information.

Before introducing the embodiments of the present disclosure, the following definitions are given to related terms involved in the embodiments of the present disclosure:

Virtual integration means a mean that users may reduce their vertical integration as much as possible and maximize the utilization of external resources.

Application Platform as a Service (abbreviated as aPaaS) is a kind of cloud-based software, that provides users with a platform to develop, deploy, and manage applications without the complexity of building and maintaining the infrastructure usually related to developing and initiating applications.

A data structure refers to the collection of data elements which have one or more specific relationships with each other, that is, the collection of data elements with "structure".

A field describes a certain feature of a document, that is, a data item, and has a unique field identifier for computer recognition, also known as a data attribute.

A unique key refers to an attribute or a set of attributes that may uniquely identify each instance in an entity set or a relationship set, a field is a smaller unit than a record, and field sets consist of a record.

An exemplary embodiment of the present disclosure provides a configuration method of data integration strategy, which may be executed by an electronic device or a chip applied to the electronic device, so as to reduce the data management cost and maintenance cost under the condition of satisfying the requirements of a data source for access permission, thereby effectively reducing the virtual integration cost.

The electronic device of the exemplary embodiment of the present disclosure has a networking function and may be connected to the same network with external data sources, the electronic device may have a display function, including but not limited to a vehicle-mounted device, notebook computer, ultra-mobile personal computers (UMPC), net-book, PDA, and wearable device based on augmented reality (AR) and/or virtual reality (VR) technologies, etc.

For example, when the user equipment is a wearable device, the wearable device may also be a generic term for wearable devices on which intelligent design and develop-ment of daily wear are performed by applying wearable technology, such as glasses, gloves, watches, clothing, and shoes. A wearable device is a portable device that is worn directly on the body or integrated into the user's clothes or accessories.

The electronic device of the exemplary embodiment of the present disclosure has a platform that may set up a data integration system, such as the aPaaS platform, and the data integration system is built utilizing the aPaaS platform. In the data integration system, application products may be built, so that developers may virtually integrate external data sources without code, thus reducing data management costs and maintenance costs when satisfying the requirements of data sources for access permission, thus facilitating data communication and reducing virtual integration costs, the data models of external data sources and external objects in the data integration system may also be defined based on common protocols, so as to conveniently complete data communication without repeatedly developing interfaces.

FIG. 1 shows a schematic flowchart of a configuration method of a data integration strategy of an exemplary embodiment of the present disclosure. As shown in FIG. 1, the configuration method of the data integration strategy of the exemplary embodiment of the present disclosure may include:

Step 101: a data structure of a data source is obtained based on an access credential of the data source. The data source here may be an external data source, and the data integration platform may enter the system where the data source is located through the access credential, under the condition of satisfying the requirements of the data source for access permission. Therefore, the data integration plat-form may read the data structure of the data source from the data source utilizing the common data interface. It should be understood that the common data interface may include but is not limited to, an Open Data Protocol (abbreviated as OData) interface, a direct database interface such as a Java Database Connectivity interface, and the like.

In practical application, the method of the exemplary embodiment of the present disclosure may create external objects utilizing the access credentials of data sources, take services supporting common protocols as external data sources, and map the data schema of common protocols into data models of external objects within the data integration platform. That is when communication between the data integration platform and the external data source is estab-lished with a common protocol, the data integration platform may obtain the data structure of the data source according to the data mode of the common protocol.

Exemplary embodiments of the present disclosure may declare the access credentials based on data sources, which may be used as credentials for common data interfaces, such as OData, to access data sources, so as to achieve normal communication between the data integration platform and the data sources, thus ensuring that the data integration platform may successfully access the data sources through the common data interfaces. The access credential may include a credential identification and credential informa-tion. The credential identification is used as a credential label to distinguish it from other credentials, and the cre-dential information is used as a legal verification informa-tion for accessing data source.

Step 102: a data structure of an external object is config-ured for the data structure of the data source, and there is a mapping relationship between the data structure of the external object and the data structure of the data source. After the operation on configuring the data structure of the external object for the data structure of the data source is completed, the created external object may be updated in the object list. For the convenience of distinguishing, the exter-nal object records may be identified in the object list, and when the mouse hovers over the external object records, descriptions may be displayed to describe that the data of external systems is referenced by the external object and other similar contents.

When using external objects to consume data from data sources, the data structure according to the external object may be obtained through the mapping relationship between the data structure of the external object and the data structure of the data source according to the access credential, taking the common data interface as an interactive interface, in response to the data query request, so as to consume the data of source data normally.

It may be understood that the method of the exemplary embodiment of the present disclosure does not need to design and develop data interfaces specifically for data sources, but directly integrates and accesses virtual data through common data interfaces as interactive interfaces. Therefore, the method of the exemplary embodiment of the present disclosure may reduce data management costs and maintenance costs under the condition of satisfying the requirements of data sources for access permission, and thus facilitating data communication and data consumption and reducing virtual integration costs.

In an alternative way, as a credential label, the credential identification of the exemplary embodiment of the present disclosure may include a main identification of credential, a secondary identification of credential, and both a main identification of credential and a secondary identification of credential. The main identification of the credential can be considered as the name of the credential, which supports the names of one language or multiple languages, and the secondary identification of the credential may be considered as the unique positioning symbol of the credential when the main identification of the credential cannot uniquely deter-mine the access credential, the access credential may be determined by combining the main identification of creden-tial and the secondary identification of the credential.

As access credentials and authentication information for accessing data sources, the above credential information may include a data location parameter and permission verification information. If the data source is an open data source without login, then the credential information may include the address of the data source (i.e., Uniform Resource Locator, abbreviated as URL); if the data source is one that needs password verification, the credential infor-mation may include not only the URL of the data source but also user name and password.

For example, the parameters used in the development environment and the online environment of the access credential of the exemplary embodiment of the present disclosure may be the same or different, and these param-eters may be the contents contained in the credential information. The development environment here may refer to the environment for creating credentials, external objects, and setting up pages, and the online environment may refer to the scene where other clients access an application after the application is developed and released.

For example, when access credentials are used in the development environment and online environment, the parameters used are divided into two sets of parameters of the development environment and online environment, which are stored in the data integration system respectively for subsequent call in the development environment and online environment by the external objects. That is during virtual integration and testing of the development environment, the development environment parameters of the access credential may be used to obtain the data format for configuration, or the data details for display and consumption, when display and consumption are performed in an online environment, the online environment parameters of the access credential is used to obtain the data details for display and consumption. In addition, when the development environment is released, whether the data formats of the development environment parameters and the online environment parameters are consistent may be checked, so as to ensure that the online environment may run successfully as the development environment.

In order to facilitate the understanding of the credential creation process of the exemplary embodiment of the present disclosure, the following is an example with the attached drawings. It should be understood that the following examples are only used to explain the credential creation process, in actual scenes, the credential creation process may be presented in various forms, not limited to the following examples.

Figure 2A:
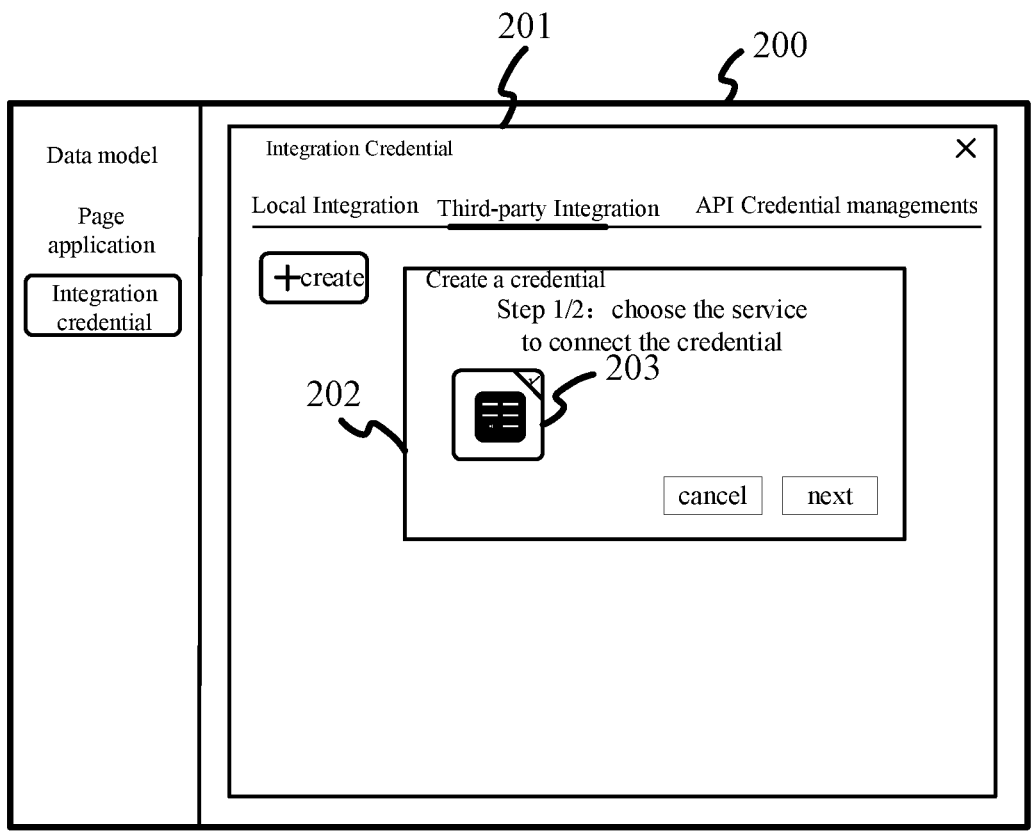
FIG. 2A shows a first stage schematic diagram of a creation process of a credential of an exemplary embodiment of the present disclosure.
Figure 2B:
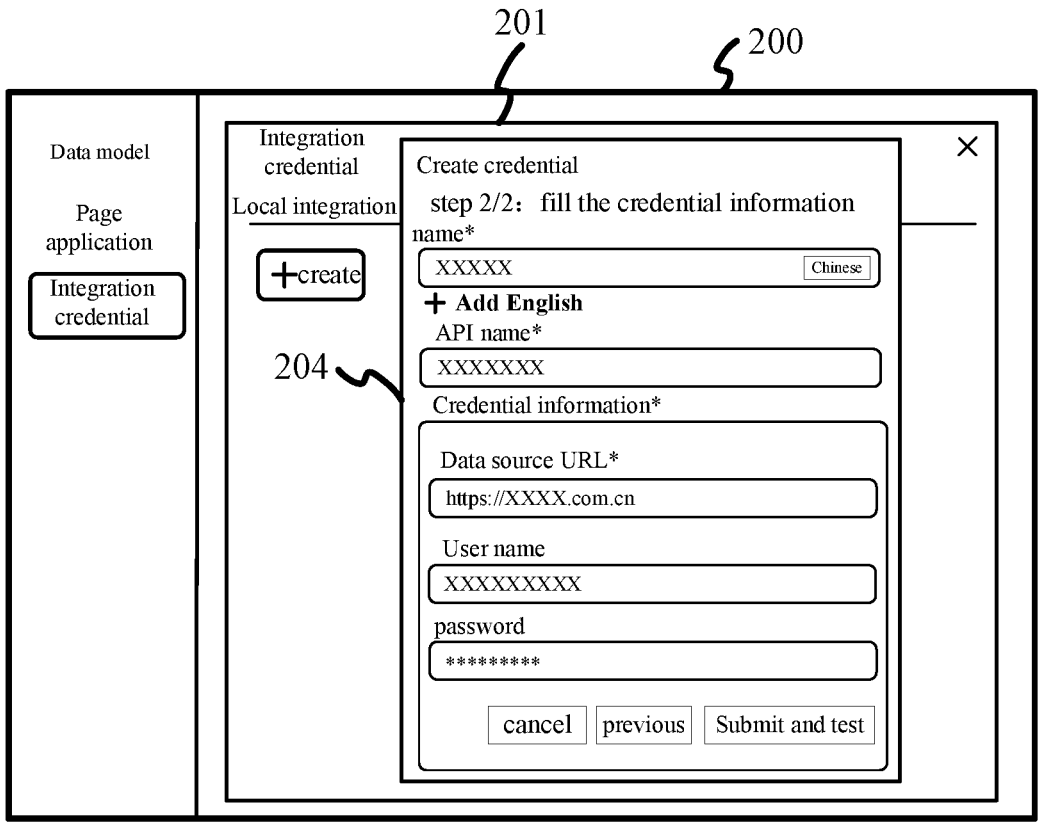
FIG. 2B shows a second stage schematic diagram of a creation process of a credential of the exemplary embodiment of the present disclosure.

FIG. 2A shows the first stage schematic diagram of the credential creation process of the exemplary embodiment of the present disclosure, and FIG. 2B shows the second stage schematic diagram of the credential creation process of the exemplary embodiment of the present disclosure. As shown in FIG. 2A, an integration credential tab may be selected in the application interface 200 of the data integration platform, so that an integration credential interface 201 may be displayed, in which a local integration tab, a third-party integration tab, and an API credential management interface tab may be displayed. By selecting the third-party integration tab, the new control may be displayed as the entry of credential creation, and the initial page 202 of the newly created credential may pop up by clicking the new control. Within the initial page 202 of the newly created credential, the operation instructions for creating the credential may be displayed, for example, "Step 1/2: Select the credential connection service", the credential creation process may be ended by canceling the control, or the credential filling popup 204 shown in FIG. 2B may be entered by clicking the next control.

As shown in FIG. 2B, the credential filling popup 204 of the exemplary embodiment of the present disclosure displays a credential identification filling unit and a credential information filling unit, and may also display the current operation instructions of the credential filling popup 204, such as "Step 2/2: Fill in the credential information".

The credential identification filling unit above comprises a name label and an API name label, and these labels are all configured with filling popups that are filled with the corresponding label contents, these labels may be customized contents or contents randomly allocated by the data integration system. The name as the main identification of the credential of the exemplary embodiment of the present may be used in the name of both Chinese and English languages, for example, the Chinese name may be directly filled into the filling popup marked "Chinese" below the name, and the English filling popup of the name may be added by adding the English control below, and the English name may be input into it. The API name label, as a secondary identification of the credential, has the function of a unique positioning symbol to ensure the uniqueness of the access credential.

The credential information filling unit above includes a data source URL label, user name label, and password label, and these labels are all configured with filling popups that are filled with the corresponding label contents. The contents of these labels are all from the data source. Here, the URL filled in the fill-in popup of the URL label of the data source may be manually input or automatically filled in by the data integration system. In addition, the credential information filling unit may also display relevant descriptions of credential information, such as whether the credential information used in the online environment and the development environment is the same.

For example, as shown in FIG. 2A, a data source selection portal 203 is displayed on the initial page 202 of the newly created credential, and the data source connected with the credential may be selected by clicking the data source selection portal 203, so that the data integration system may determine the data source URL based on the selected data source. When entering the credential filling popup 204 shown in FIG. 2B, the data integration system may automatically fill in the specific content of the data source URL in the filling popup of the data source URL label based on the determined data source URL.

Considering that some data sources may provide free public accounts for users, such as trial users, as shown in FIG. 2A, after clicking on the data source selection portal 203 to select the data source connected with the credential, the data integration system may also determine the account information including the user name and password of the data source based on the selected data source. When entering the credential filling popup 204 shown in FIG. 2B, the data integration system may also automatically fill in the corresponding label contents in the user name label and password label based on the free public account.

After completing the filling of the required label content in the credential filling popup 204, Submit and Test control may be clicked to test the filled label content to ensure that the data integration system may test whether the data source may be accessed based on the access credential, if the data source may be successfully accessed, it means that the access credential was successfully created and the access credential was successfully saved, otherwise, it means that there is a problem with the access credential and the access credential cannot be successfully created. At this point, the data integration system may pop up a reminder message that the creation of the access credential failed for the user to view and re-input the required label.

For example, each label contained in the credential identification filling unit and the credential information filling unit may be marked with a required mark, and the user is required to fill contents into the filling box with these labels, for the label filling box without a required mark, and the contents may be filled in or not.

In some alternative ways, the exemplary embodiment of the present disclosure may declare the external objects of the data integration system according to the selected data source, at this time, obtaining the data structure of the data source based on the access credentials of the data source may include:

In response to the operation on selecting the access credential, if the access credential is valid, the target data table of the data source is determined based on the access credential, and the data structure of the target data table is obtained based on the access credential, the data structure of the data source is obtained based on the target data table, and the data structure of the target data table may be the data structure of the data source.

In practical application, after selecting the access credential, the access credential may be automatically checked to determine whether there is a network failure or whether the data table of the data source cannot be queried. If the access credential is checked successfully, all data tables contained in the data source may be obtained from the data source based on the access credential, otherwise, there is a network failure or the data table of the data source cannot be queried, and the data integration system displays an error message, prompts "Credential verification failed, please check the credential" and other related information.

If the number of data tables is one, the data table may be directly determined as the target data table; if the number of data tables is multiple, one data table needs to be selected as the target data table from a plurality of data tables, based on this, there is a one-to-one correspondence relationship between data tables and external objects, based on this when an external object is created based on the target data table, another external object cannot be created using a target data table, it can be seen that when the number of data tables is multiple, a plurality of data tables may include selectable data tables and unselectable data tables. At least multiple data tables of the data source are displayed based on the access credentials, and the plurality of data tables include selectable data tables and unselectable data tables. Based on this, when the data tables of the data source are a plurality of data tables, the process of determining the target data table of the data source based on the access credentials may include:

A target data table of a data source is determined to correspond to the external object in response to a selection operation on one selectable data table among the plurality of data tables, and a target data table of the data source is determined to correspond to the external object in response to a selection operation on one selectable data table among a plurality of data tables. For the unselectable data table, the unselectable data table may be grayed out, marked, or locked, so that the unselectable data table cannot be performed with a selection operation, thus avoiding the condition that the unselectable data table is defined as the target data table.

The exemplary embodiment of the present disclosure may also fill in the basic information of external objects, such as the identification of external objects and the identification of external objects, the identification of external objects may be divided into main identification of the object and secondary identification of the object, and the main identification of the object may support one language or multiple languages.

In order to facilitate the understanding of the external object creation process of the exemplary embodiment of the present disclosure, the description is made as follows with the drawings. It should be understood that the following examples are only used to explain the external object creation process, in actual scenes, the external object creation process may be presented in various forms, not limited to the following examples.

Figure 3A:
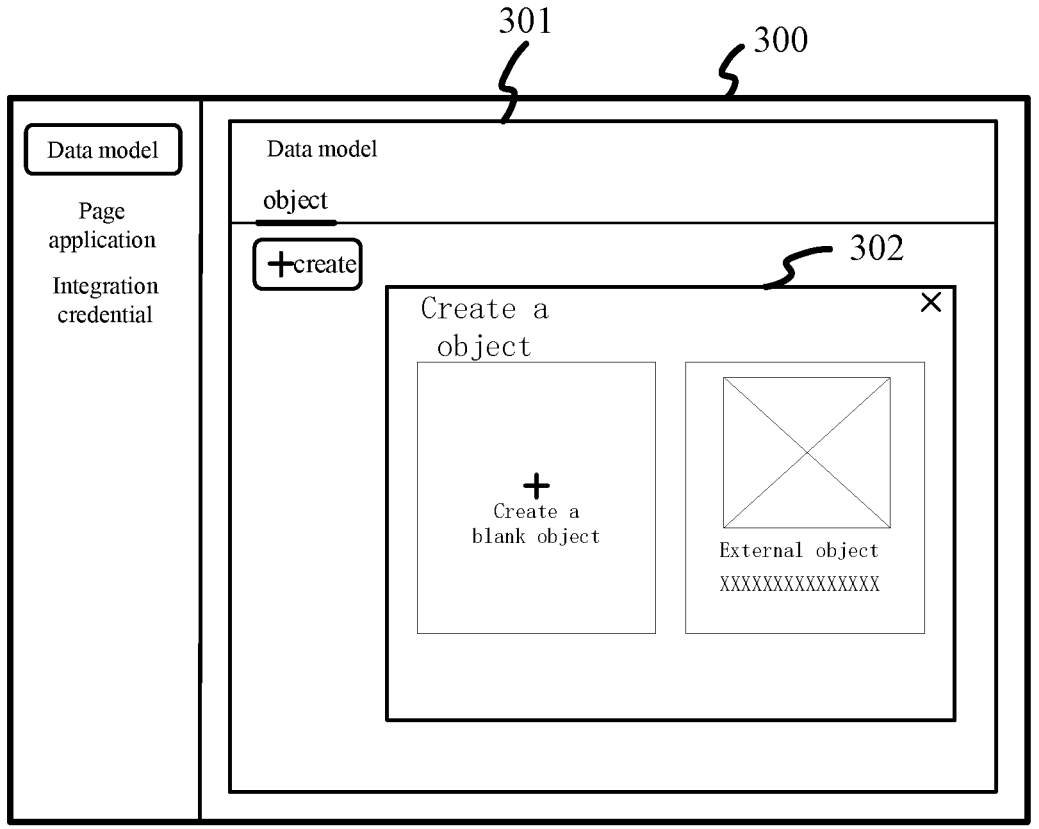
FIG. 3A shows a first stage schematic diagram of a creation process of an external object of an exemplary embodiment of the present disclosure.
Figure 3B:
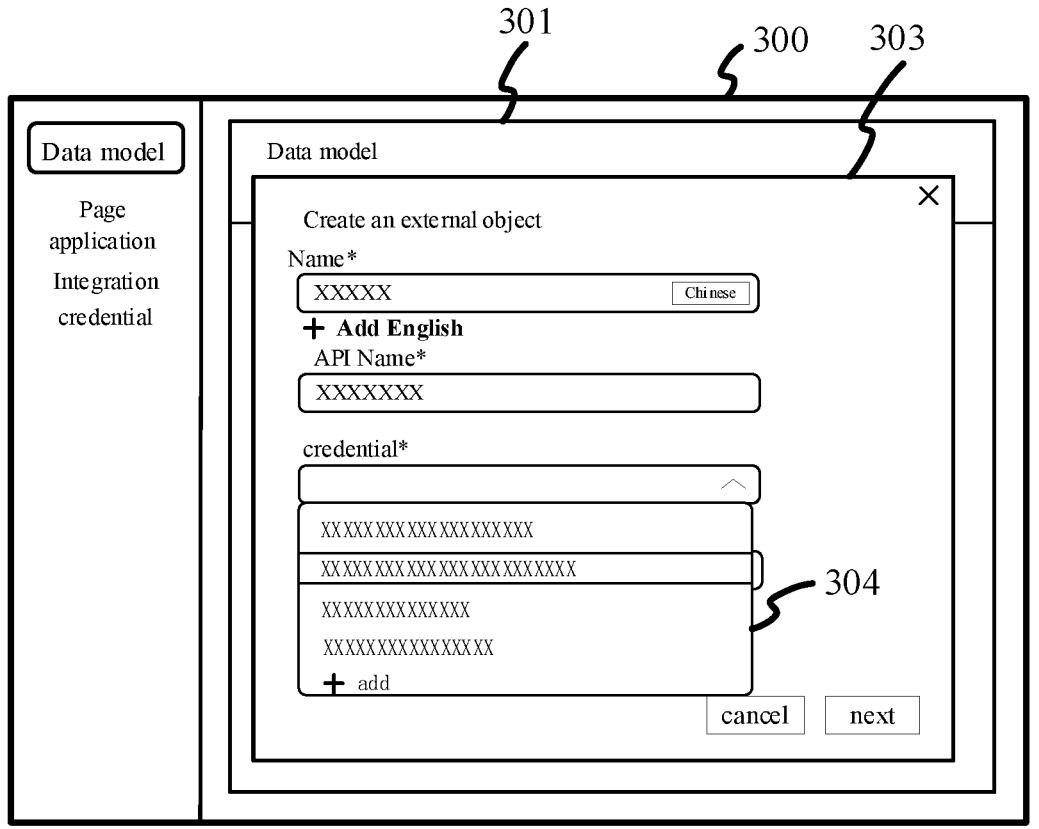
FIG. 3B shows a second stage schematic structure diagram of a creation process of an external object of an exemplary embodiment of the present disclosure.

FIG. 3A shows the first stage schematic diagram of the creation process of an external object of an exemplary implementation of the present disclosure, and FIG. 3B shows the second stage schematic structure diagram of the creation process of an external object in an exemplary implementation of the present disclosure. As shown in FIG. 3A, a data model tab may be selected in the application interface 300 of the data integration platform, so as to display an object creation interface 301, where a newly created control may be displayed as an object creation portal, by clicking a newly created control, an initial interface 302 of a newly created object may be pop up, the initial page 302 of the newly created object may create both a blank object and an external object, by clicking a newly created label of the external object, a basic information editing page 303 of the external object shown in FIG. 3B may be jumped to.

As shown in FIG. 3B, in the external object basic information editing page 303, label contents may be filled in the filling boxes of the name label and API label, and the name label supports bilingual naming in Chinese and English. Meanwhile, a credential drop-down box 304 may be displayed by clicking the drop-down button on the right side of the credential label filling box, and an access credential displayed from the credential drop-down box 304 may be filled in the credential label filling box. If the required access credential does not exist in the credential drop-down box 304, FIG. 3B may be jumped to by clicking the Add control shown in the credential drop-down box 304 to jump to, in order to create an new access credential. It may be seen that the access credential creation process of the exemplary embodiment of the present disclosure may be realized in two ways, one is to create a new access credential through the object creation interface 301, and the other is to create a new access credential in the new created control of the credential drop-down box 304 of the external object basic information editing page 303. The process of creating new access credentials may be substantially achieved by means of low code.

As shown in FIG. 3B, after the access credential is selected in the credential drop-down box 304 by the exemplary embodiment of the disclosure, if the data integration platform may access the data source through the access credential in case where there is one data table in the data source, it may be automatically filled in the filling box of the data source label, and if there are a plurality of data tables in the data source, it may be displayed and selected by means of the data table drop-down box.

Figure 3C:
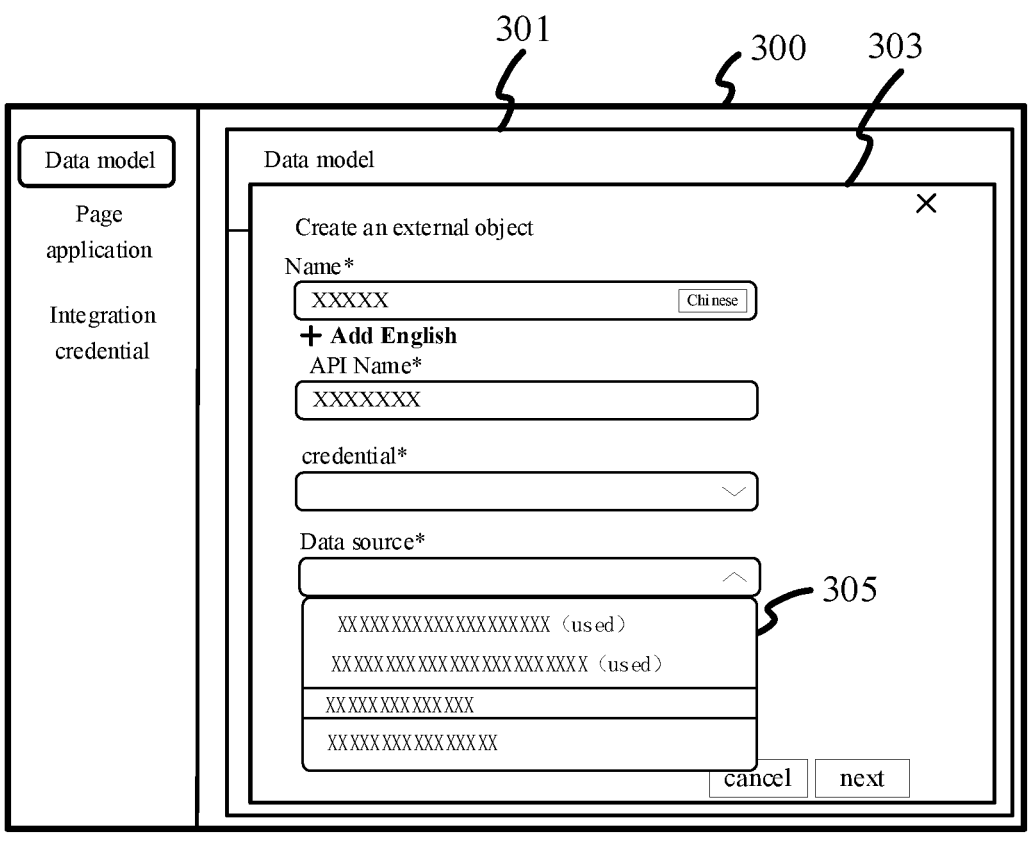
FIG. 3C shows the third stage schematic diagram of a creation process of an external object of an exemplary embodiment of the present disclosure.

FIG. 3C shows the third stage schematic diagram of the creation process of the external object in the exemplary embodiment of the present disclosure. As shown in FIG. 3C, when a plurality of data tables are obtained based on the access credentials, the data table drop-down box 305 may be displayed by clicking the drop-down control on the right side of the data source label, considering that there is a one-to-one correspondence relationship between data tables and external objects, thus, if a data table by which an external object was created exists in the list of data table displayed in the data drop-down box 305, the data table may be marked as a used data table, and the way of marking may include but not limited to text marking, graphic marking or voice marking. When credential filling, data table selection, and external object identification filling are completed, the field setting interface may be jumped to for subsequent processes.

In an alternative way, the data structure of the data source of the embodiment of the present disclosure may include a plurality of first data attributes, the data structure of the external object may include at least one second data attribute and at least one of the plurality of first data attributes has a mapping relationship with the second data attribute. That is, the second data attribute may be mapped for each of the plurality of first data attributes, and the second data attribute may be mapped for some of the plurality of first data attributes. The mapping relationship here may be a one-to-one mapping relationship.

In practical application, the first data attribute above is substantially the first field in the data table stored in the data source, and the second data attribute is substantially the first field customized in the external model, and both the first field and the second field may include the field identification and the field type of the field. For example, after determining the target data table of the data source based on the access credentials, the exemplary embodiment of the present disclosure may obtain the data structure of the target data table, that is, the data source definition, which contains the first field, from the data source based on the access credentials.

Figure 4:
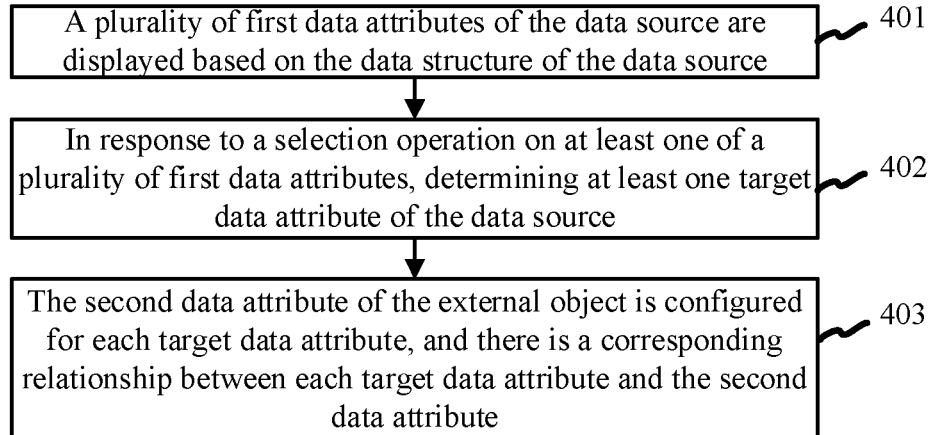
FIG. 4 shows a schematic diagram of a mapping relationship configuration flow of an exemplary embodiment of the present disclosure.

FIG. 4 shows a schematic diagram of a mapping relationship configuration flow of an exemplary embodiment of the present disclosure. As shown in FIG. 4, an exemplary embodiment of the present disclosure configures the data structure of an external object based on the data structure of the data source, which may include:

Step 401: A plurality of the first data attributes of the data source are displayed based on the data structure of the data source. Since the data structure of a data source includes a plurality of first data attributes, thus, all the first data attributes of the data source may be displayed based on the data structure of the data source, and a selection control may also be displayed for each first data attribute, by selecting the control, whether a second data attribute is mapped to the first data attribute may be decided, or a configuration box of the second data attribute may be displayed for each first data attribute, and the configuration box of the second data attribute may be located in the same line as the mapped first data attribute to form a record.

Step 402: in response to a selection operation on at least one of a plurality of first data attributes, at least one target data attribute of the data source is determined.

The selection control above indicates that the first data attribute needs to be mapped, therefore, when a selection operation is performed on certain one of a plurality of first data attributes, it may be determined that these first data attributes need to be configured with a second data attribute mapped one-to-one with the first data attribute, for example, the name of the second data attribute may be customized for the name of the first data attribute, and the type of the second data attribute may also be customized for the type of the first data attribute.

Step 403: the second data attribute of the external object is configured for each target data attribute, and there is a corresponding relationship between each target data attribute and the second data attribute.

In practical application, the second data attribute of the external object may be configured for each target data attribute in response to the input operation, so that there is a corresponding relationship between each target data attribute and the second data attribute. Considering that both the first data attribute as the target data attribute and the second data attribute contain the attribute identification and the attribute type, thus, when configuring the external object for the target data attribute, the field name and the field type may be configured respectively.

Considering that there is a unique key data attribute in the data table, which is non-editable, thus, a plurality of first data attributes contain unique key data attributes, and at least one second data attribute contains a system default attribute that has a mapping relationship with the unique key data attribute, that is, the second data attribute may contain a unique key field of the data source, but the unique key field is automatically generated or defaulted by the system and cannot be edited, at this time, the system default attribute corresponding to the unique key data attribute may be not displayed.

Categories of data attributes of exemplary embodiments of the present disclosure may include floating point, character string, text, associated object, Boolean, number, date, date time, mailbox, associated object, etc. In order to increase the depth and breadth of data access, at least one second data attribute contains at least one second data attribute of an associated object type. When the data type of the second data attribute is an associated object, any type of created object may be associated with, such as a blank object, other application object, etc.

Exemplary embodiments of the present disclosure may also configure a single-valued associated object or a multi-valued associated object for the associated object. When the associated object is configured as a single-value associated object, when accessing the data display page, one value or one of the values corresponding to the second field of the associated object type has a hyperlink mark, and the associated object of the value with hyperlink mark may be jumped to by clicking the value with the hyperlink mark. When the associated object is configured as a single-value associated object, when accessing the data display page, one value or two or more values among the plurality of values corresponding to the second field of the associated object type have hyperlink marks, the object associated with the value may be jumped to by clicking the value with the hyperlink mark.

For example, when the second label corresponding to the associated object is a name, a record corresponding to the name includes three names, namely, Zhang San, Li Si, and Wang Er, and at least two of the three names, Zhang San, Li Si, and Wang Er, have hyperlink identifications, so that the detailed information of the corresponding names may be accessed through the hyperlink identification.

In order to facilitate the understanding of the field setting process of the exemplary embodiment of the present disclosure, the following is an example taken in conjunction with the attached drawings. It should be understood that the following examples are only used to explain the external object creation process, in the actual scene, the external object creation process may be presented in various forms, not limited to the following examples.

Figure 5:
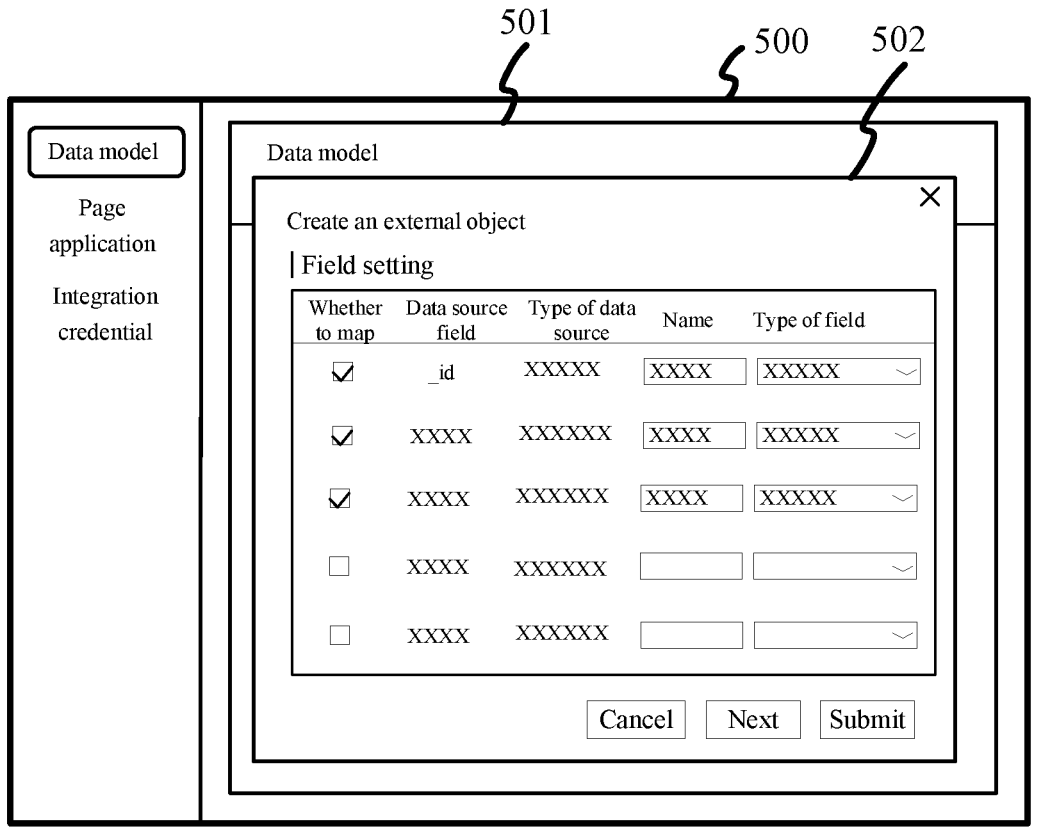
FIG. 5 shows a schematic diagram of a field setting interface of an exemplary embodiment of the present disclosure.

FIG. 5 shows a schematic diagram of a field setting interface of an exemplary embodiment of the present disclosure. As shown in FIG. 5, the field setting interface 501 in the application interface 500 of the data integration system shows a mapping relationship configuration table 502 formed by multiple records, the mapping relationship configuration table 502 may include four fields: whether to map, data source, data source type, name and field type, in which the data source field and data source field type cannot be edited, the box in front of each record is checked by default to indicate the field name and field type of the record need to be edited.

According to the records that do not need to be configured with the mapping relationship, users may selectively cancel the records that do not need to be configured with the mapping relationship, and then keep the boxes of other records that need to be configured with the mapping relationship in the checked state. Among them, the record where the unique key data attribute (the first record) is located may not be edited, the default data attribute may be automatically allocated by the system, and its attribute type may be numeric, which may be used as the system field of the external object. When the field name and field type are contained in all the records that need to be configured with the mapping relationship, the field setting result may be submitted by clicking the Submit button.

In order to further edit the external object, after the field setting result is submitted, the related information of the external object and the related information corresponding to at least one second data attribute is edited in response to the completion operation on the configuration of the mapping relationship of the first data attribute and the second data attribute.

As global information, the related information of the external object above may include external object identification and/or data display ways corresponding to the external object, and as detailed information, the related information corresponding to the second data attribute may include data type corresponding to the second data attribute and/or data display ways corresponding to the second data attribute as detailed information.

In practical application, the mapping relationship between the first data attribute and the second data attribute may jump to the external object editor without falling into the library. If an external object needs to be edited, the external object may be edited in the external object editor, and then the submission is confirmed, so that the mapping relationship of the first data attribute and the second data attribute falls into the library; if the external object does not need to be edited, the submission is confirmed directly, so that the mapping relationship of the first data attribute and the second data attribute falls into the library.

For example, the above-mentioned external object editor has an object editing interface, which may be displayed in response to the completion operation of the configuration of the mapping relationship of the first data attribute and the second data attribute, the object editing interface is at least used to display a reference list, related information of the external object and related information corresponding to at least one second data attribute, the reference list may be a second data attribute list in essence, but because there is a mapping relationship between the second data attribute and the first data attribute, the reference list may actually be regarded as a list that reflects the first data attribute with a mapping relationship.

Considering that there may be a first data attribute that is not configured with a second data attribute, the object editing interface may also be used to display a non-reference list, which includes the first data attribute that does not have a mapping relationship with the second data attribute, so that a new first data attribute is added to the reference list in the object editing interface, and the second data attribute is configured for the newly added first data attribute. Based on this, the method of the exemplary embodiment of the present disclosure may further include adding the first data attribute to the reference list in response to an operation on a first data attribute in the non-reference list, and configuring a corresponding second data attribute in an external object for the first data attribute, so that the first data attribute in the reference list is transformed into a second data attribute having a mapping relationship with the first data attribute. The second data attribute here may be modified on the basis of the first data attribute, or the mapped second data attribute may be configured separately for the first data attribute in other places, after the mapped second data attribute is configured separately for the first data attribute in other places, the first data attribute located in the reference list is transformed into a second data attribute with a mapping relationship with it.

For example, the above-mentioned object editing interface has a first editing sub-interface and a second editing sub-interface. The first editing sub-interface includes a list display area and a detail editing area, and the list display area may be used to display both reference lists and non-reference lists. The details editing area may edit related information of external objects, even related information corresponding to at least one second data attribute. For example, in response to the selection operation on the mapping relationship of the second data attribute, the related information of the external object may be edited in the details editing area, thus providing a portal for the modification of the external object. The second editing sub-interface is used to display the related information of external objects and provide a portal for the modification of external objects. If the type of the second data attribute is an associated object, the related information of the associated object may be edited in the details editing area.

The above-mentioned first editing sub-interface and second editing sub-interface may be switched with each other, and the following is an example. It should be understood that the following is only for explanation and as a limitation, there may be various possible variations in the actual scene.

Figure 6A:
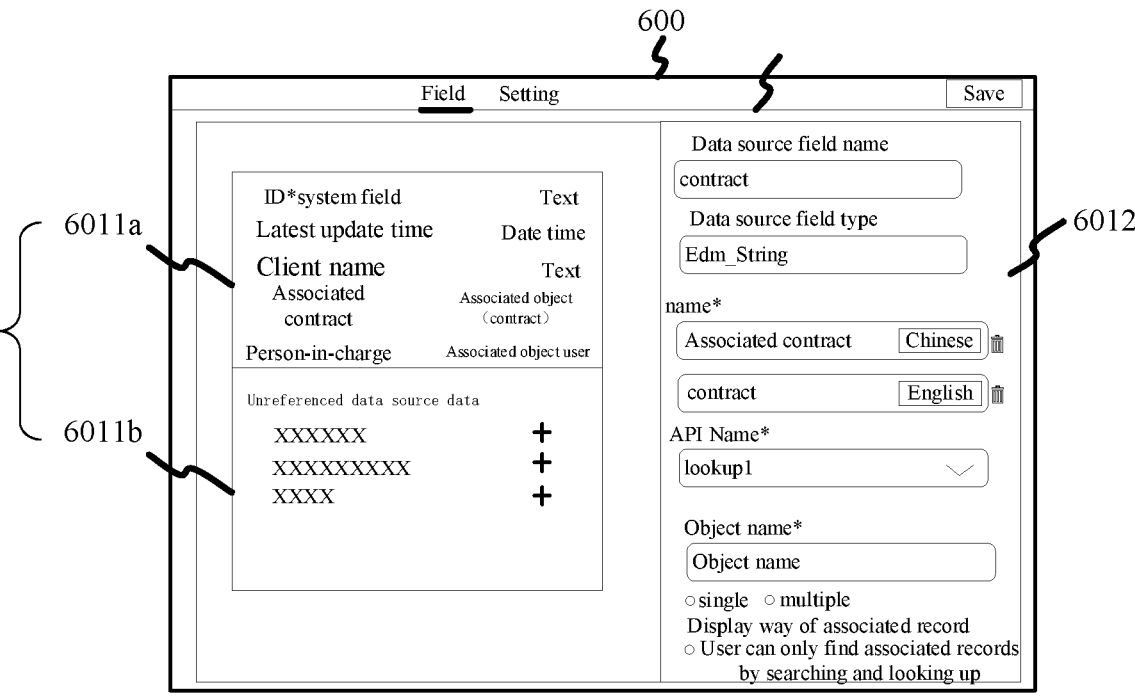
FIG. 6A shows a schematic diagram of an object editing interface in a display state of a first editing sub-interface of an exemplary embodiment of the present disclosure.

FIG. 6A shows a schematic diagram of an object editing interface in a first editing sub-interface display state of an exemplary embodiment of the present disclosure. FIG. 6B shows a schematic diagram of an object editing interface in a second editing sub-interface state of an exemplary embodiment of the present disclosure. As shown in FIGS. 6A and 6B, the first editing sub-interface 601 and the second editing sub-interface 602 of the object editing interface 600, the first editing sub-interface 601 may be displayed in the object editing interface 600 when clicking the field label, and the second editing sub-interface 602 may be displayed in the object editing interface 600 when clicking the set label.

As shown in FIG. 6A, the first editing sub-interface 601 may include a list display area 6011 and a detail editing area 6012. The list display area 6011 may display a reference list 6011a and a non-reference list 6011b, the reference list 6011 may be located above the non-reference list 6011b, and the non-reference list 6011b may be named with the title of "Unreferenced Data Source Field".

As shown in FIG. 6A, the reference list 6011a includes all the second data attributes, which substantially indirectly reflects the first data attribute that has a mapping relationship with the second data attribute, while the non-reference list includes the first data attribute that does not have mapping relationship with the second data attribute. Therefore, the contents displayed in the reference list 6011a and the non-reference list 6011b may reflect that all fields of the data source are displayed in the list display area 6011. When it is necessary to add a new second data attribute to the reference list 6011a in the list display area 6011, it is substantially to indirectly add the first data attribute to the reference list 6011a, and then edit the second data attribute mapped by the first data attribute.

For example, as shown in FIG. 6A, if it is necessary to configure one first data attribute displayed in the non-reference list 6011b with a second data attribute mapped to it, the add control of the first data attribute (that is, the "plus"

control) may be clicked to move the first data attribute to the reference list 6011a, or the first data attribute may be dragged to the reference list 6011a by way of dragging the first data attribute, thereby the first data attribute may be moved to the reference list 6011a.

As shown in FIG. 6A, when the first data attribute is moved to the reference list 6011a, the name and type of the first data attribute in the reference list 6011a may be edited, and related contents in the details editing area 6012 may also be edited. For example, two required terms which are the name of the external object and the API name may be edited in the edit details editing area 6012. The names of external objects may include Chinese names, English names, or both Chinese names and English names. The data source field name and data source field type belong to the content provided by the data source and belong to non-editable content.

If the type of the second data attribute is an associated object, the object name of the associated object may be set, whether the number of associated records is single or multiple, and the display mode options of associated records may also be set, for example, the way that users may only find associated records by searching and looking up may be chosen. It should be understood that when setting the object name of the associated object, any type of object that has been created may be associated.

When clicking the set label, the first editing sub-interface 601 shown in FIG. 6A may be switched to the second editing sub-interface 602 shown in FIG. 6B. Configuration items such as the name of the external object, API name, display name, secondary information, and searchable fields during the search may be displayed in the second editing sub-interface. In the second editing sub-interface 602, the name of the external object, API name, and secondary information during the search may be configured according to the actual situation, the display name is set as the identity (ID) field by default, and may also be modified into other required text fields. If the searchable field is not supported, a reminder message may be displayed when the searchable field editing label is selected (for example, the mouse hovers over the searchable field editing label): "The external object does not support the configuration of [searchable field]. When searching, all fields of the object will be searched."

When the exemplary embodiment of the present disclosure detects that there is a newly added first data attribute in the data source, the newly added first data attribute is not configured to map the second virtual data, nor is it included in the non-reference list, therefore, the non-reference list may be updated based on the newly added first data attribute, so that the first data attribute included in the non-mapping relationship table contains the newly added first data attribute, which is convenient for application builders to find out the increase of the first data attribute of the data source in time and decide whether it is necessary to add the newly added first data attribute to the reference list.

When a reduced first data attribute in the data source is detected, if there is no mapping relationship between the first data attribute and the second data attribute, it may be determined that the reduced first data attribute was originally in the non-reference list, and the non-reference list may be updated based on the reduced first data attribute, so that the non-reference list does not contain the first data attribute that no longer exists in the data source, and the problem that subsequent pages cannot be accessed is avoided, the problem is caused by: the application builder did not obtain the condition of data attribute reduction of the data source in time and added the first data attribute that doesn't exist in the data source to the reference list.

When there is a changed first data attribute in the data source, if it contains the first data attribute that has a mapping relationship with the second data attribute, the data cannot be obtained normally when accessing the data of the data source through external objects, and the data integration system will report an error and display an error page 700 as shown in FIG. 7 and other similar messages.

In order to ensure normal access to the data source, the method of the exemplary embodiment of the present disclosure may further include detecting that there is a changed first data attribute in the data source, if the changed first data attribute contains a first data attribute that has a mapping relationship with a second data attribute, displaying a prompt message with an object editing interface portal, displaying the object editing interface in response to the operation on the object editing interface portal, and displaying that the second data attribute mapped by the changed first data attribute is deleted on the object editing interface.

In practical application, the data source of the exemplary embodiment of the present disclosure may be changed by deleting the first data attribute, changing the name and/or type of the first data attribute, or even completely deleting the entire data table or data source. At this time, the mapping relationship between the first data attribute and the second data attribute changes.

The above prompt message is used to prompt that the data source is changed, and the following is an example to describe the deletion of a field or an entire table by the data source.

When the data source deletes a field or the entire table of the data source is deleted, a prompt message may be sent to the client by an application engine robot to prompt the developer and/or administrator of the external object. The prompt message may be as follows:

Title: Data source adjustment of the external object; Text: The upstream data source of ⌈{object name}⌋ in ⌈{application name}⌋ has changed, which has affected the normal operation of the application, please adjust it as soon as possible; Button: 【Go to the Development Background】; after clicking 【Go to the Development Background】, you may jump to the object editing interface 600 as shown in FIG. 6A.

In the object creation interface in the configuration background of the external objects, a prompt message may be displayed to remind the application builder, the prompt message may include: the application uses an unauthorized external object field, and the application will not run normally. If the application needs to run normally, please cancel the use of the unauthorized field, and a "View Details" button is displayed in the prompt message, the object editing interface 600 as shown in FIG. 6A may be jumped to by clicking the "View Details" button.

If the data source fields of a plurality of external objects are deleted, the first external object in the object list page may be jumped to by default, and the r Reference of Unauthorized Fields is viewed in the unauthorized fields reference page after the first external object being clicked.

The unauthorized field reference page displays the usage of the reference fields whose authorities have been revoked in the development environment, the object editing interface as shown in FIG. 6A is jumped to by clicking the "Go to Modify" button according to the module made by the object, field, the module when reference locations reusing deleted fields, rules of reference locations. The difference between the unauthorized field reference page between the online environment and the development environment is that the button "Go to the development environment for modification" is added in the prompt area at the top of the page, after the button is clicked, the new page will open the page r References of Unauthorized Fields j of the development environment, that is, the object editing interface 600 as shown in FIG. 6A, at the same time, the button in operation is called "Go to View", and after the button is clicked, the object editing interface 600 of read-only metadata is entered.

In the object editing interface, the second data attribute mapped by the changed first data attribute has invalidation indication information, which is used to indicate that the mapping relationship between the second data attribute and the first data attribute is invalid. At the same time, the invalidation indication information may also identify the reason why the mapping between the second data attribute and the first data attribute is invalid. On this basis, when the mapping relationship between the first data attribute and the second data attribute in the exemplary embodiment of the present disclosure changes, the second data attribute that needs to be deleted may be found based on the invalidation indication information, and the deletion operation needs to be performed on the second data attribute. Considering that the external object may be edited after it is created, if the second data attribute of the external object is not saved, the name and type of the second data attribute may be edited directly, however, if the second data attribute has been saved, the type of the second data attribute cannot be changed, so the second data attribute needs to be deleted, thus removing the mapping relationship between the first data attribute and the second data attribute. In addition, if the first data attribute that has a mapping relationship with the second data attribute is a unique key data attribute, the second data attribute is a system default attribute and cannot be deleted.

When deleting a whole table, deleting a field, or changing a field attribute in the data source, if the field has a mapping relationship with the second data attribute, the second data attribute may be deleted, however, if the field of the data source corresponding to the second data attribute is in the application running state, the display element, filter element, screen element, etc., of the page component may report an error and display the error copy, for example, if the page uses unauthorized data, please contact the application administrator, for another example, deleted fields in data sources are consumed in components, etc. If the process triggered by buttons such as deleted fields in the data source is consumed in the process: an error is reported when the process is initiated, the error report copy may be as follows: the operation uses data without permission, please contact the application administrator. Error: This node uses a field without permission. If the deleted fields in the data source are consumed in the permission, and an error is reported when a user accesses the page or initiates the process, the error reporting copy may be as follows: the page uses data without permission, please contact the application administrator to authorize, when the user corresponding to the role affected by the authorization rule accesses the application, the error reported may be as follows: the application uses data without permission, please contact the application administrator.

It may be seen that whether the data of the data source changes or the application builder actively changes the type of the second data attribute, the condition of whether the second data attribute is consumed needs to be considered when deleting the second data attribute, therefore, FIG. 8 shows a schematic flowchart of the second data attribute deletion of an exemplary embodiment of the present disclosure. As shown in FIG. 8, the exemplary embodiment of the present disclosure may further include:

Step 801: in response to the deletion operation on the second data attribute mapped by the first data attribute, whether the second data attribute is referenced is detected. If the second data attribute is referenced, it cannot be deleted, and the process may jump to step 802; if the second data attribute is not referenced, the process may jump to step 803.

Step 802: the reference relationship of the second data attribute is removed based on the reference relationship information of the second data attribute. In practical application, if the second data attribute is referenced, the reference relationship information of the second data attribute may be displayed, which may at least include reference indication information and a reference editing interface portal, and the reference indication information is used to indicate the module description information that references the second data attribute, therefore, the module editing interface that references the second data attribute may be displayed in response to the operation on the reference editing interface portal, and the second data attribute may be deleted in the module editing interface.

Step 803: the second data attribute mapped to the first data attribute is deleted. At this time, as shown in FIG. 6A, the second data attribute contained in the reference list 6011a may be deleted in the list display area of the object editing page 600.

If the first data attribute mapped by the second data attribute has not been deleted or changed by the data source, the first data attribute mapped by the second data attribute may be added to the non-reference list 6011b for subsequent use. For example, the application builder reselects the first data attribute and configures the name and type of the second data attribute mapped by the first data attribute. In addition, if there is related content of the second data attribute that needs to be deleted in the detail editing area 6012, such as the object name of the reference object, it may also be deleted in the detail editing area 6012.

Figure 9A:
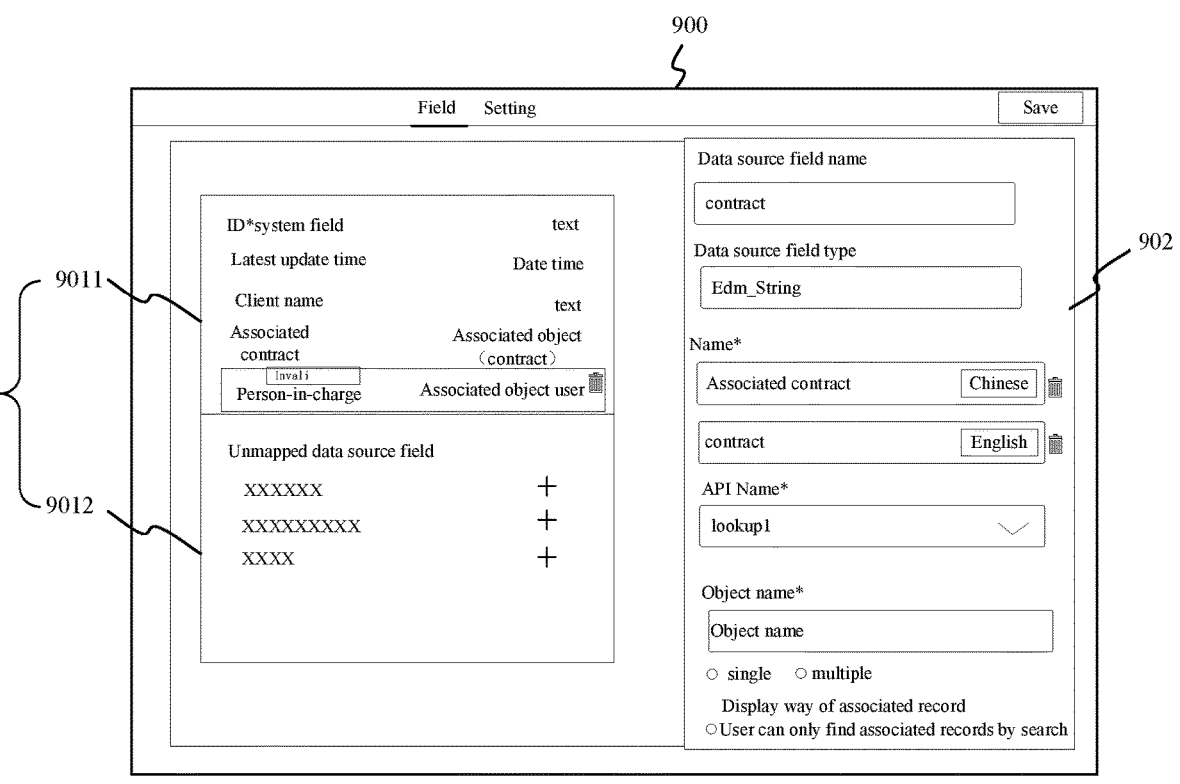
FIG. 9A shows a first stage schematic diagram of a deletion process of a second data attribute of an exemplary embodiment of the present disclosure.

FIG. 9A shows a first stage schematic diagram of the deletion process of the second data attribute of an exemplary embodiment of the present disclosure. As shown in FIG. 9A, a reference list 9011 and a non-reference list 9012 are displayed in the list display area 901 of the object editing page 900, the data source field corresponding to the person-in-charge field referenced by the reference list 9011 is deleted, and the person-in-charge field is marked with an invalid field identification, when jumping to the object editing interface 1000 to delete the field, the second data attribute to be deleted may be easily determined by the invalid field identification.

Figure 9B:
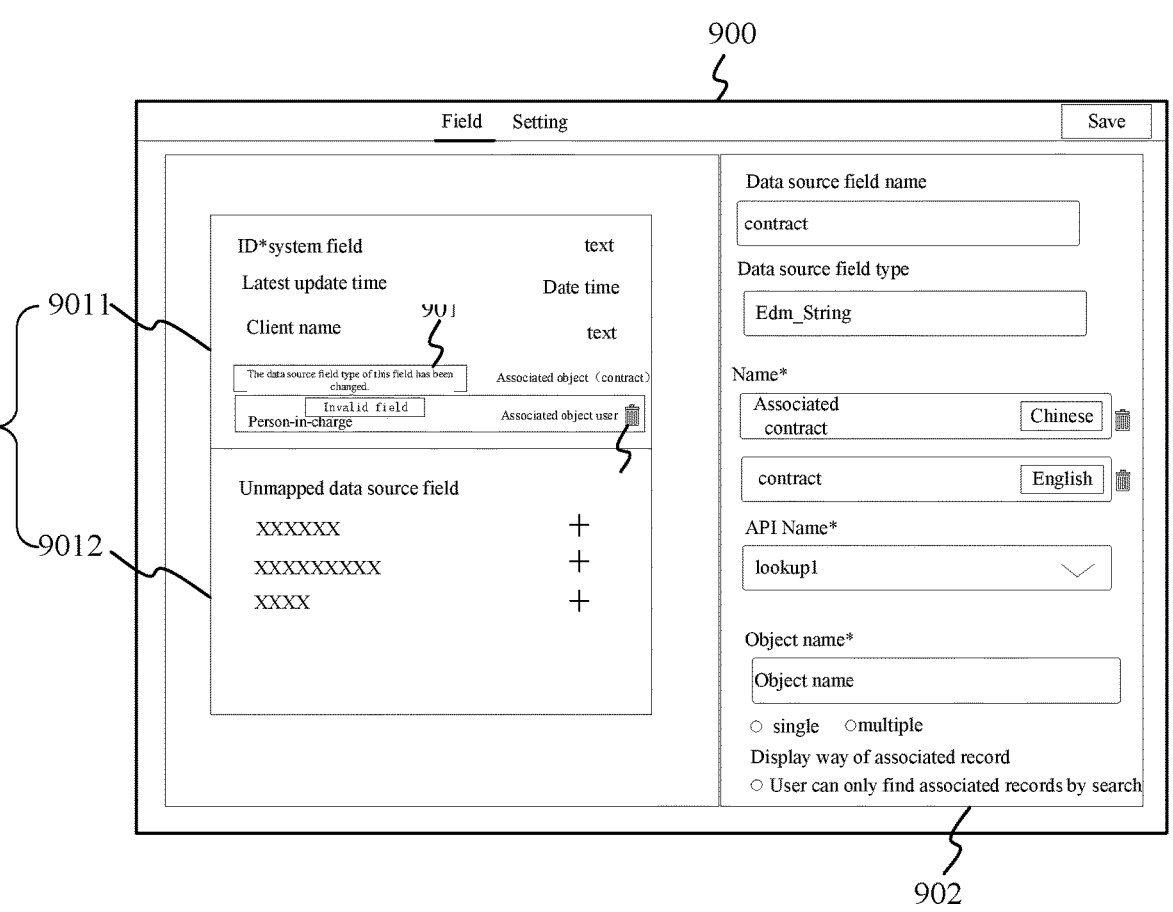
FIG. 9B shows a second stage schematic diagram of a deletion process of a second data attribute of an exemplary embodiment of the present disclosure.

FIG. 9B shows a second stage schematic diagram of the deletion process of the second data attribute of an exemplary embodiment of the present disclosure. As shown in FIG. 9B, when the mouse hovers or selects the person-in-charge field, an invalidation description 9013 may be displayed, and the invalidation description 9013 and the invalidation field identification may constitute invalidation indication information. In response to clicking the delete identification 9014 of the person-in-charge field, whether the person-in-charge field is referenced may be detected, and if it is referenced, the deletion failure popup 903 shown in FIG. 9C of the exemplary embodiment of the present disclosure may be shown.

Figure 9C:
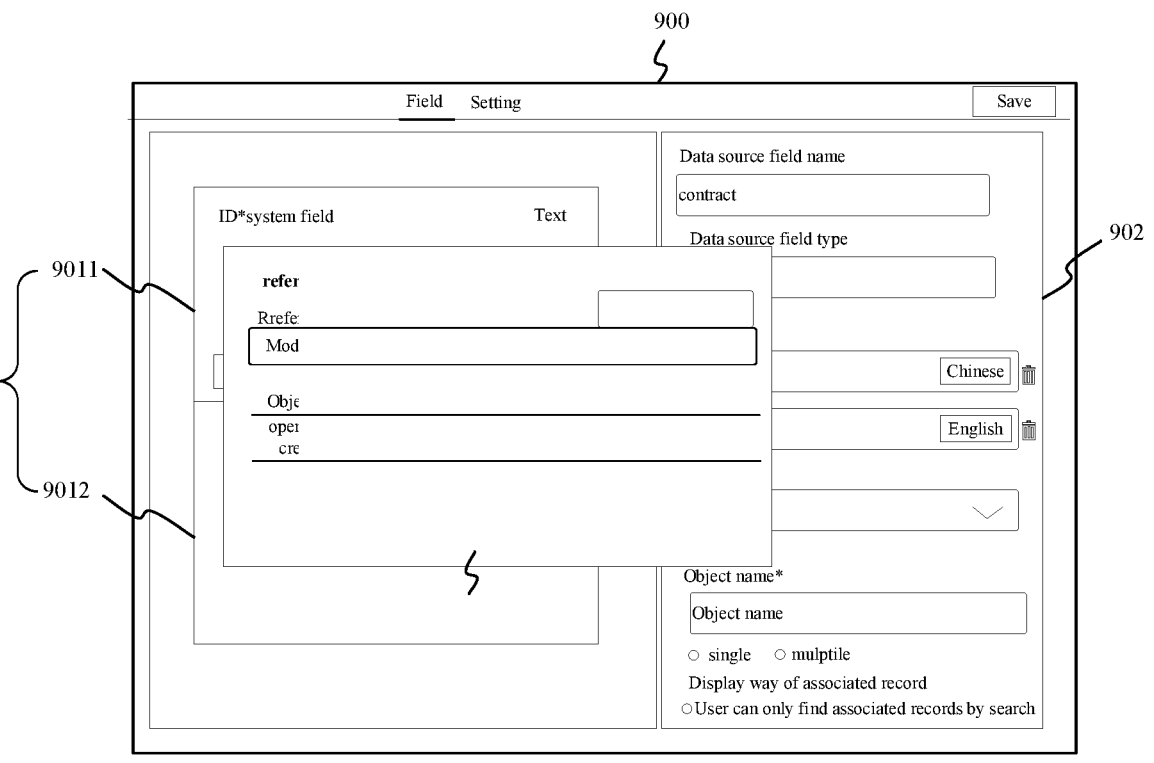
FIG. 9C shows a schematic diagram of a popup of a failed deletion of an exemplary embodiment of the present disclosure.

As shown in FIG. 9C, the deletion failure popup 903 not only shows the reference indication information but also shows the solution strategy of deletion failure, this reference indication information includes the module, the reference location, and the module editing interface portal in the form of "Go to Modify". The module indicates the module identification referencing the person-in-charge field, and the reference location indicates the position of the module referencing the person-in-charge field. The portal of the module editing interface may allow users to conveniently and quickly enter the module editing interface to delete the person-in-charge field. Of course, the person-in-charge field may also be deleted by manually finding the module editing interface directly through the module and reference location.

FIG. 10 shows a schematic flowchart of a data integration method of an exemplary embodiment of the present disclosure. As shown in FIG. 10, the data integration method further provided by the exemplary embodiment of the present disclosure may include:

Step 1001: generating request parameters corresponding to a data query request that comply with the requirements of a common protocol based on a mapping relationship between a data structure of an external object and a data structure of a data source in response to the data query request for the external object.

In practical application, the data query request for an external object may be parsed, and the data structure of the data query request matches the data structure of the external object. Therefore, based on the mapping relationship between the data structure of the external object and the data structure of the data source, the request parameters corresponding to the data query request that comply with the requirements of the common protocol may be generated; and the data structure of the data source matches the common protocol, therefore, based on the mapping relationship between the data structure of the external object and the data structure of the data source, generating the request parameters that comply with the requirements of the common protocol is essentially a process of transforming the data query request into a data query request that complies with the common protocol.

Step 1002: requesting the data source to return data from the data source based on an access credential of the data source and the request parameters that comply with the requirements of the common protocol. The essence of this step is the process of data interaction between the application platform and the data source, it uses the access credential of the data source as authentication information and transmits the request parameters that comply with the requirements of the common protocol to the data source through the common protocol, the access credential may ensure that data may be successfully obtained from the data source based on the request parameter that complied with the requirements of the common protocol, while the request parameters that comply with the requirements of the common protocol may ensure that the obtained data content complies with the needs of users, and because the request parameters that comply with the requirements of the common protocol are matched with the common protocol, the common protocol may return the request parameters that comply with the requirements of the common protocol from the data requested by the data source to the application platform.

Step 1003: displaying the data returned from the data source in the data structure of the external object based on the mapping relationship of the data structure of the external object and the data structure of the data source.

In practical application, the data source returns data through the common protocol, which is substantial data complying with the requirements of the common protocol, by resolving the data complying with the requirements of the common protocol, the data source requested by the common platform may be obtained, but the data returned by this data source cannot be displayed on the front end of application platform due to the problem of data structure, therefore, the data of this data source may be transformed into data results complying with the requirements of application platform, that is, the data structure of external objects, through the mapping relationship of the data structure of external objects and the data structure of data source, so as to be displayed on the front end of the application platform.

FIG. 11 shows a schematic diagram of a data integration architecture of an exemplary embodiment of the present disclosure. As shown in FIG. 11, the data integration architecture of the exemplary embodiment of the present disclosure includes an application platform 1101, and an external system 1102. The application platform 1101 may communicate with the external system 1102 through the common number interface.

The application platform 1101 above includes a business layer 1101A and a data layer 1101B, the business layer 1101 includes a page building module builder, a flow building module Automation and a LowCode module LowCode, the page building module is used to build a data display page, and users may access the data display page to display the data of the data source, the flow building module Automation is used to jump to the credential filling popup 204 shown in FIG. 2B with the assistance of the low code module LowCode. The data layer 1101B includes a blank object and an external object.

In practical application, the user terminal may access the application platform 1101 and send the data query request to the data layer 1101B through the business layer 1101A, the data layer 1101B may transform the data query request into request parameters that comply with the requirements of the common protocol, and transmit the request parameters that comply with the requirements of the common protocol and the access credential to the external system 1102 through the common protocol, after the external system 1102 successfully verifies the access credentials, the data that needs to be returned to the application platform 1101 may be queried from the external system data based on the request parameters that comply with the requirements of the common protocol, and the generated data may be returned to the application platform 1101 through the common protocol, the application platform 1101 uses external objects for data transformation in the data layer 1101B and displays it through the business layer 1101A.

In practical application, the data layer 1101B above may include an object module including a custom object, a system object, and an external object, and a data processing module including a data statistics module, a data query module, and a format transformation module. The data layer 1101B may use the data query module to query the corresponding external object, and with the assistance of the external object, the format transformation module may transform the data query request into the request parameters that comply with the requirements of the common protocol, or transform the format of the data returned by the external system 1102 through the external object, and finally display it through the business layer 1101A. At the same time, business layer 1101A may also send a request to data layer 1101B, and data layer 1101B performs various statistics on the queried data utilizing the data statistics module, and returns the statistical results to the business layer 1101A for display.

In one or more technical solutions provided in the embodiment of the present disclosure, when the data structure of the data source is obtained based on the access credential of the data source, the system where the data source is located may be entered under the condition of satisfying the requirements of the data source for access permission through the access credential, thus, the data structure of the data source may be read from the data source utilizing the common data interface. On this basis, the data structure of the external object is configured for the data structure of the data source, so that there is a mapping relationship between the data structure of the external object and the data structure of the data source. At this time, when using external objects to consume data from the data source, the data structure according to the external object is obtained through the mapping relationship between the data structure of the external object and the data structure of the data source according to the access credential, taking the common data interface as the interactive interface, in response to the data query request, so as to consume the data of source data normally. It may be seen that the method of the exemplary embodiment of the present disclosure does not need to design and develop a data interface specifically for the data source, but directly integrates and accesses the virtual data through the common data interface. Therefore, the method of the exemplary embodiment of the present disclosure may reduce the data management cost and maintenance cost while satisfying the requirements of the data source for access permission, thereby facilitating data communication and data consumption and reducing the virtual integration cost.

The above mainly introduces the scheme provided by the embodiment of the present disclosure from the perspective of electronic device. It may be understood that, in order to realize the above functions, the electronic device includes corresponding hardware structures and/or software modules for performing various functions. Those skilled in the art should easily realize that the present disclosure can be implemented in hardware or a combination of hardware and computer software in combination with the various example units and algorithm steps described in the embodiments disclosed herein. Whether a function is executed by hardware or hardware driven by computer software depends on the specific application and design constraints of the technical scheme. Those skilled in the art may use different methods to implement the described functions for each specific application, but such implementation should not be considered as going beyond the scope of this disclosure.

The embodiment of the present disclosure may divide the electronic device into functional units according to the above method example, for example, each functional module corresponding to each function may be divided, and two or more functions may also be integrated into one processing module. The above integrated modules may be realized in the form of hardware or software functional modules. It should be noted that the division of modules in the embodiment of this disclosure is schematic, and is only one logical function division, and there may be another division method in actual implementation.

Figure 12:
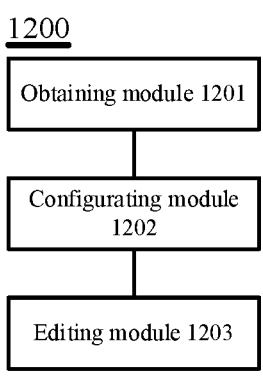
FIG. 12 shows a schematic block diagram of functional modules of a configuration apparatus of a data integration strategy according to an exemplary embodiment of the present disclosure.

Under the condition that each function module is divided according to each function, an exemplary embodiment of the present disclosure provides a configuration apparatus of a data integration strategy, which may be an electronic device or a chip applied to the electronic device. FIG. 12 shows a schematic block diagram of a functional module of a configuration apparatus of a data integration strategy according to an exemplary embodiment of the present disclosure. As shown in FIG. 12, the configuration apparatus 1200 of the data integration strategy includes:

an obtaining module 1201 used for obtaining the data structure of a data source based on the access credentials of the data source;

a configuring module 1202 used for configuring the data structure of an external object for the data structure of the data source, and the data structure of the external object has a mapping relationship with the data structure of the data source.

In one possible implementation, the access credential of the data source includes a credential identification and credential information, and the credential information includes data location parameters and permission verification information.

In one possible implementation, the obtaining module 1201 is used for determining a target data table of the data source based on the access credential in the case where the access credential is valid in response to the operation of selecting the access credential and obtaining a data structure of the target data table based on the access credential. The data structure of the target data table is the data structure of the data source.

In one possible implementation, the data tables of the data source is a plurality of data tables, and the obtaining module 1201 is used for displaying at least a plurality of data tables of the data source based on the access credentials, The plurality of data tables include selectable data tables and unselectable data tables, and determining the target data table of the data source corresponding to the external object in response to the selection operation on one selectable data table among the plurality of data tables.

In one possible implementation, the data structure of the data source includes a plurality of first data attributes, and the data structure of the external object includes at least one second data attribute, and at least one of the plurality of first data attributes has a mapping relationship with the second data attribute.

In one possible implementation, the at least one second data attribute contains at least one second data attribute of an associated object type; and/or, the plurality of first data attributes contain a unique key data attribute, and the at least one second data attribute contains a system default attribute having a mapping relationship with the unique key data attribute.

In one possible implementation, the configuration module 1202 is used for displaying a plurality of first data attributes of the data source based on the data structure of the data source, determining at least one target data attribute of the data source in response to a selection operation on at least one of the first data attributes, and configuring a second data attribute of the external object for each of the target data attributes, each of the target data attributes has a corresponding relationship with the second data attribute.

In one possible implementation, the apparatus may further include an editing module 1203, which is used for editing the related information of the external object and related information corresponding to the at least one second data attribute in response to the configuration completion operation of the mapping relationship of the first data attribute and the second data attribute; wherein the related information of the external object includes the external object identification and/or the data display way corresponding to the external object, and the related information corresponding to the second data attribute includes the data type corresponding to the second data attribute and/or the data display way corresponding to the second data attribute.

In one possible implementation, the editing module 1203 is further used to display an object editing interface in response to the completion operation of configuration of the mapping relationship of the first data attribute and the second data attribute, the object editing interface is at least used to display a reference list, relevant information of the external object and at least relevant information corresponding to the second data attribute, and the reference list is a list of the second data attribute.

In one possible implementation, the object editing interface is also used to display a non-reference list, which includes a first data attribute that does not have a mapping relationship with the second data attribute, and the editing module 1203 is further used to:

updating the non-reference list based on a newly added first data attribute when detecting that there is the newly added first data attribute in the data source; and/or, updating the non-reference list based on a reduced first data attribute in a case where there is no mapping relationship between the first data attribute and the second data attribute when detecting that there is the reduced first data attribute in the data source; and/or, in response to an operation on one of the first data attributes in the non-reference list, adding the first data attribute to the reference list, and configuring the second data attribute of the external object corresponding to the first data attribute, so that the first data attribute in the reference list is transformed into the second data attribute which has the mapping relationship with the first data attribute.

In one possible implementation, the editing module 1203 is further used to detect that there is a changed first data attribute in the data source, and if the changed first data attribute contains a first data attribute having a mapping relationship with the second data attribute, display a prompt message with the object editing interface portal, and display the object editing interface in response to the operation on the object editing interface portal; delete the second data attribute mapped by the changed first data attribute in the object editing interface, and the prompt message is used to prompt the data source is changed; the second data attribute mapped by the changed first data attribute has invalidation indication information for indicating that the mapping relationship between the second data attribute and the first data attribute is invalid.

In one possible implementation, the apparatus further comprises an editing module 1203, which is used for removing the reference relationship of the second data attribute based on the reference relationship information of the second data attribute in a case where the second data attribute is referenced, in response to the deletion operation on the second data attribute mapped by the first data attribute, and deleting the second data attribute mapped by the first data attribute in a case where the second data attribute is not referenced.

In one possible implementation, the editing module 1203 is used to display the reference relationship information of the second data attribute, which at least includes reference indication information and a reference editing interface portal, and display a module editing interface referencing the second data attribute in response to the operation on the reference editing interface portal; delete the second data attribute in the module editing interface, and the reference indication information is used to indicate the module description information that references the second data attribute.

Figure 13:
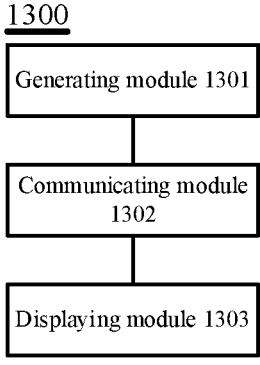
FIG. 13 shows a schematic block diagram of functional modules of a data integration apparatus according to an exemplary embodiment of the present disclosure.

In the case that each function module is divided according to each function, an exemplary embodiment of the present disclosure provides a data integration apparatus, which may be an electronic device or a chip applied to the electronic device. FIG. 13 shows a schematic block diagram of functional modules of a data integration apparatus according to an exemplary embodiment of the present disclosure. As shown in FIG. 13, the data integration apparatus 1300 includes:

a generating module 1301, used for generating request parameters of the data query request that complies with the requirements of the common protocol based on the mapping relationship between a data structure of an external object and a data structure of a data source, in response to the data query request for an external object, and;

a communicating module 1302, used for requesting data source from the data source to return data based on the access credential of the data source and the request parameters that comply with the requirements of the common protocol;

a displaying module 1303, used for displaying the data returned from the data source in the data structure of the external object based on the mapping relationship between the data structure of the external object and the data structure of the data source.

Figure 14:
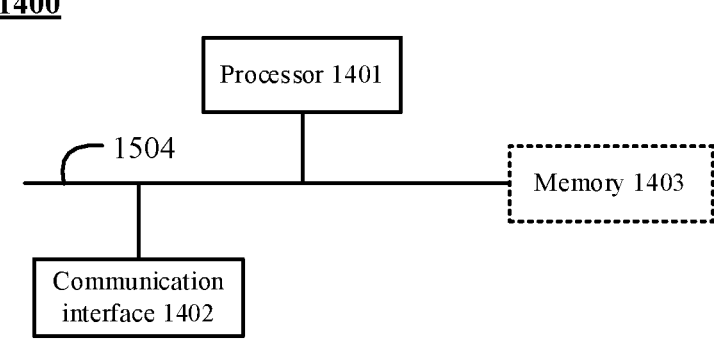
FIG. 14 shows a schematic block diagram of a chip according to an exemplary embodiment of the present disclosure.

FIG. 14 shows a schematic block diagram of a chip according to an exemplary embodiment of the present disclosure. As shown in FIG. 14, the chip 1400 includes one or more than two (inclusive) processors 1401 and a communication interface 1402. The communication interface 1402 may support the electronic device to perform the data transmitting and receiving steps in the above method, and the processor 1401 may support the electronic device to perform the data processing steps in the above method.

Optionally, as shown in FIG. 14, the chip 1400 further includes a memory 1403, which may include a read-only memory and a random access memory and provides operating instructions and data to the processor. A part of the memory may also include a non-volatile random access memory (NVRAM).

In some embodiments, as shown in FIG. 14, processor 1401 executes the corresponding operation by calling the operation instruction stored in the memory (which may be stored in the operating system). A processor 1401 controls the processing operation of any one of the terminal devices, and the processor may also be called a central processing unit (CPU). The memory 1403 may include a read-only memory and a random access memory and provides instructions and data to the processor 1401. A part of the memory 1403 may also include NVRAM. For example, memory, communication interface and memory are coupled together through a bus system, wherein the bus system may include a power bus, a control bus, and a status signal bus in addition to a data bus. However, for the sake of clarity, various buses are labeled as bus system 1404 in FIG. 14.

The method disclosed in the embodiment of the present disclosure may be applied to or realized by a processor. The processor may be an integrated circuit chip with signal-processing capability. In the process of implementation, the steps of the above method may be completed by hardware-integrated logic circuits or software instructions in the processor. The processor may be a general processor, a digital signal processing (DSP), an ASIC, a field-programmable gate array (FPGA) or other programmable logic devices, discrete gate or transistor logic devices, and discrete hardware components. The method, steps, and logic block diagram disclosed in that embodiments of the present disclosure may be implemented or executed. The general processor may be a microprocessor or the processor may be any conventional processor, etc. The steps of the method disclosed in combination with the embodiment of the present disclosure may be directly embodied as the completion of execution by a hardware decoding processor, or the completion of execution by a combination of hardware and software modules in the decoding processor. Software modules may be located in random access memory, flash memory, read-only memory, programmable read-only memory, or electrically erasable programmable memory, registers, and other mature storage media in this field. The storage medium is located in the memory, and the processor reads the information in the memory and combines its hardware to complete the steps of the above method.

An exemplary embodiment of the present disclosure also provides an electronic device, including at least one processor; and a memory communicatively connected with the at least one processor. The memory stores a computer program that may be executed by the at least one processor, and the computer program, when executed by the at least one processor, is used for causing the electronic device to perform the method according to the embodiment of the present disclosure.

Exemplary embodiments of the present disclosure also provide a non-transitory computer-readable storage medium storing computer programs, wherein the computer programs, when executed by a processor of a computer, is used to cause the computer to perform the method according to the embodiment of the present disclosure.

Exemplary embodiments of the present disclosure also provide a computer program product, including a computer program, wherein the computer program, when executed by a processor of a computer, is used to cause the computer to perform the method according to the embodiment of the present disclosure.

Figure 15:
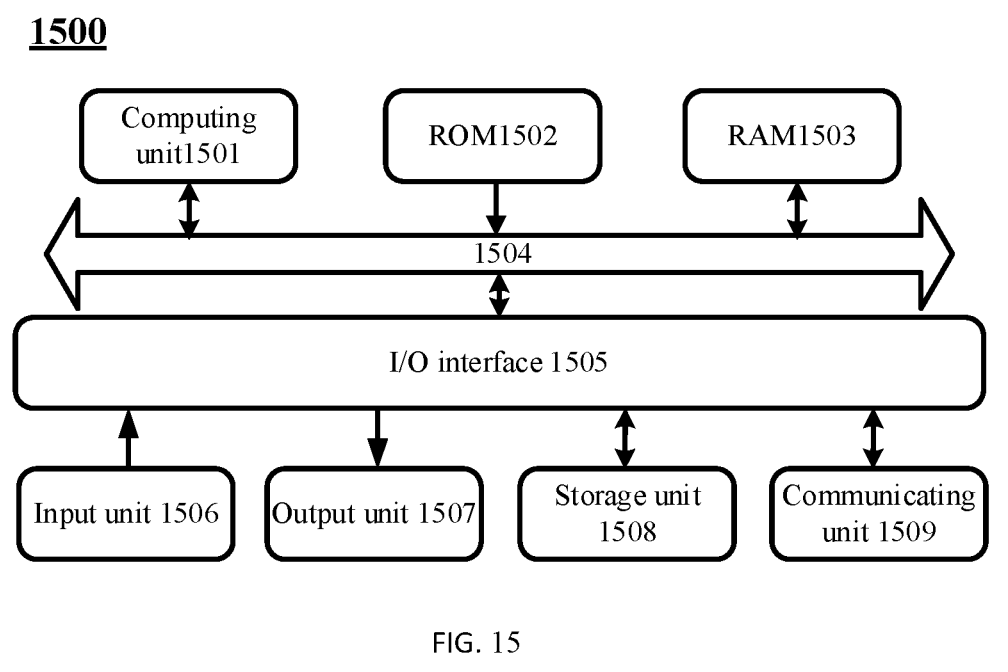

Referring to FIG. 15, a structural block diagram of an electronic device 1500 that may be a server or a client of the present disclosure will now be described, which is an example of a hardware device that may be applied to various aspects of the present disclosure. Electronic devices are intended to represent various forms of digital electronic computer devices, such as laptop computers, desktop computers, workstations, personal digital assistants, servers, blade servers, mainframe computers, and other suitable computers. Electronic devices may also represent various forms of mobile apparatus, such as personal digital assistants, cellular phones, smart phones, wearable devices and other similar computing apparatus. The components shown herein, their connections and relationships, and their functions are only examples, and are not intended to limit the implementation of the present disclosure described and/or claimed herein.

As shown in FIG. 15, an electronic device 1500 includes a computing unit 1501, which may perform various appropriate actions and processes according to a computer program stored in a read-only memory (ROM)1502 or a computer program loaded from a storage unit 1508 into a random access memory (RAM)1503. In the RAM 1503, various programs and data required for the operation of the device 1500 may also be stored. A computing unit 1501, a ROM 1502, and a RAM 1503 are connected to each other through a bus 1504. An input/output (I/O) interface 1505 is also connected to the bus 1504.

As shown in FIG. 15, a plurality of parts in the electronic device 1500 are connected to the I/O interface 1505, including an input unit 1506, an output unit 1507, a storage unit 1508, and a communication unit 1509. The input unit 1506 may be any type of device capable of inputting information to the electronic device 1500, and the input unit 1506 may receive input numeric or character information and generate key signal input related to user settings and/or function control of the electronic device. The output unit 1507 may be any type of device capable of presenting information and may include but is not limited to a display, a speaker, a video/audio output terminal, a vibrator, and/or a printer. The storage unit 1508 may include but is not limited to, a magnetic disk and an optical disk. The communication unit 1509 allows the electronic device 1500 to exchange information/data with other devices through a computer network such as the Internet and/or various telecommunication networks and may include but is not limited to a modem, a network card, an infrared communication device, a wireless communication transceiver and/or a chipset, such as a Bluetooth™ device, a WiFi device, a WiMax device, a cellular communication device and/or the like.

As shown in FIG. 15, the computing unit 1501 may be various general and/or special processing components with processing and computing capabilities. Some examples of the computing unit 1501 include but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 1501 performs the various methods and processes described above. For example, in some embodiments, the method of the exemplary embodiment of the present disclosure may be implemented as a computer software program tangibly embodied in a machine-readable medium, such as the storage unit 1508. In some embodiments, part or all of the computer program may be loaded and/or installed on the electronic device 1500 via the ROM 1502 and/or the communication unit 1509. In some embodiments, the computing unit 1501 may be configured to perform the methods of the exemplary embodiments of the present disclosure by any other suitable means (for example, by means of firmware).

The program code for implementing the method of the present disclosure may be written in any combination of one or more programming languages. These program codes may be provided to a processor or controller of a general-purpose computer, a special-purpose computer, or other programmable data processing apparatus, so that the program codes, when executed by the processor or controller, cause the functions/operations specified in the flowcharts and/or block diagrams to be implemented. The program code may be completely executed on a machine, partially executed on a machine, partially executed on a machine as a separate software package, and partially executed on a remote machine, or completely executed on a remote machine or server.

In the context of the present disclosure, the machine-readable medium may be a tangible medium that may include or store a program for use by or in combination with an instruction execution system, apparatus, or device. The machine-readable medium may be a machine-readable signal medium or a machine-readable storage medium. The machine-readable medium includes but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

As used in this disclosure, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including machine-readable media that receive machine instructions as machine-readable signals. The term "machine-readable signal" refers to any signal used to provide machine instructions and/or data to a programmable processor.

In order to provide interaction with users, the systems and techniques described herein may be implemented on a computer having a display apparatus (for example, a CRT (cathode ray tube) or an LCD (liquid crystal display) monitor) for displaying information to users; and a keyboard and a pointing device (for example, a mouse or a trackball) through which a user may provide input to the computer. Other kinds of apparatus may also be used to provide interaction with users; for example, the feedback provided to the user may be any form of sensory feedback (for example, visual feedback, auditory feedback, or tactile feedback); and the input from the user may be received in any form, including acoustic input, voice input or tactile input.

The systems and techniques described herein may be implemented in a computing system that includes a back-end component (e.g., as a data server), a computing system that includes a middleware component (e.g., an application server), or a computing system that includes a front-end component (e.g., a user computer with a graphical user interface or a web browser through which a user may interact with embodiments of the systems and techniques described herein), or a computing system that includes a combination of such back-end component, middleware component, front-end component. Components of the system may be interconnected by any form or medium of digital data communication (for example, communication network). Examples of communication networks include local area network (LAN), wide area network (WAN) and Internet.

A computer system may include a client and a server. The client and server are generally far away from each other and usually interact through a communication network. The relationship between client and server is generated by computer programs running on corresponding computers and having a client-server relationship with each other.

In the above embodiments, it may be realized in whole or in part by software, hardware, firmware or any combination thereof. When implemented in software, it may be fully or partially implemented in the form of a computer program product. The computer program product includes one or more computer programs or instructions. When the computer program or instruction is loaded and executed on a computer, the flow or function described in the embodiment of the present disclosure is fully or partially executed. The computer may be a general-purpose computer, a special-purpose computer, a computer network, a terminal, user device or other programmable apparatus. The computer program or instructions may be stored in a computer-readable storage medium or transmitted from one computer-readable storage medium to another. For example, the computer program or instructions may be transmitted from one website, computer, server or data center to another website, computer, server or data center by wired or wireless means. The computer-readable storage medium may be any available medium that a computer may access or a data storage device such as a server or a data center that integrates one or more available media. The available media may be magnetic media, such as floppy disk, hard disk, magnetic tape; it may also be an optical medium, such as a digital video disc (DVD); it may also be a semiconductor medium, for example, a solid state drive (SSD).

Although the present disclosure has been described in connection with specific features and embodiments thereof, it is apparent that various modifications and combinations may be made without departing from the spirit and scope of the present disclosure. Accordingly, the specification and drawings are merely illustrative description of the present disclosure as defined by the appended claims, and are regarded as covering any and all modifications, variations, combinations or equivalents within the scope of the present disclosure. Apparently, those skilled in the art may make various modifications and variations to the present disclosure without departing from its spirit and scope. Thus, if these modifications and variations of the present disclosure are within the scope of the claims of the present disclosure and their equivalents, the present disclosure is also intended to include these modifications and variations.

The invention claimed is:

1. A method for integrating data by a data integration platform, comprising:
    receiving input by the data integration platform, wherein the input is indicative of an access credential for accessing a data source;
    reading a data structure of the data source by the data integration platform based on the access credential being verified, wherein the data structure of the data source comprises a plurality of first data attributes;
    creating an external object by the data integration platform based on the data structure of the data source, wherein a data structure of the external object comprises one or more second data attributes, and wherein there is a mapping relationship between the one or more second data attributes and one or more of the first plurality of data attributes;
    in response to a completion operation associated with configuring the data structure of the external object, displaying an object editing interface, wherein the object editing interface displays a reference list and related information of the external object, wherein the reference list comprises a list of the one or more second data attributes having a mapping relationship with the one or more first data attributes;
    in response to input associated with the reference list, editing the mapping relationship between the one or more second data attributes and the one or more first data attributes;
    obtaining data from the data source by the data integration platform based on the mapping relationship between the one or more second data attributes and the one or more first data attributes; and
    displaying the data obtained from the data source by the data integration platform in accordance with the data structure of the external object.

2. The method according to claim 1, wherein the access credential of the data source comprises a credential identification and credential information, and the credential information comprises a data location parameter and verification information of permission.

3. The method according to claim 1, wherein reading the data structure of the data source comprises:

determining a target data table of the data source based on the access credential in a case where the access credential is a valid access credential; and obtaining a data structure of the target data table based on the access credential, wherein the data structure of the target data table is the data structure of the data source.

4. The method according to claim 3, wherein there are a plurality of data tables of the data source, and determining the target data table of the data source based on the access credential comprises:

displaying at least the plurality of data tables of the data source based on the access credential, wherein the plurality of data tables comprise selectable data tables and unselectable data tables; and determining the target data table of the data source corresponding to the external object in response to a selection operation on one selectable data table among the plurality of data tables.

5. The method according to claim 1, wherein the one or more second data attributes contain a second data attribute of at least one associated object type; and/or the plurality of first data attributes contain a unique key data attribute, and the one or more second data attributes contains a system default attribute which has a mapping relationship with the unique key data attribute.

6. The method according to claim 5, further comprising:

in response to a deletion operation on the one or more second data attributes mapped by the one or more first data attributes, removing a reference relationship of the one or more second data attributes based on reference relationship information of the one or more second data attributes in a case where the one or more second data attributes is referenced, and deleting the one or more second data attributes mapped by the one or more first data attributes in a case where the one or more second data attributes is not referenced.

7. The method according to claim 1, further comprising configuring the data structure of the external object based on the data structure of the data source, wherein the configuring the data structure of the external object based on the data structure of the data source comprises:

displaying the plurality of first data attributes of the data source based on the data structure of the data source;

determining at least one target data attribute of the data source in response to a selection operation on at least one of the plurality of first data attributes; and configuring the one or more second data attributes of the external object for each target data attribute, wherein there is a corresponding relationship between each target data attribute and the one or more second data attributes.

8. The method according to claim 7, further comprising:

in response to a deletion operation on the one or more second data attributes mapped by the one or more first data attributes, removing a reference relationship of the one or more second data attributes based on reference relationship information of the one or more second data attributes in a case where the one or more second data attributes is referenced, and deleting the one or more second data attributes mapped by the one or first data attribute in a case where the one or more second data attributes is not referenced.

9. The method according to claim 1, further comprising:

editing the related information of the external object and related information corresponding to the one or more second data attributes in response to a completion operation of configuration of the mapping relationship between the one or more first data attributes and the one or more second data attributes, wherein the related information of the external object comprises an identification of the external object and/or a data display way corresponding to the external object, and the related information corresponding to the one or more second data attributes comprises a data type corresponding to the one or more second data attributes and/or a data display way corresponding to the one or more second data attributes.

10. The method according to claim 9, further comprising:

in response to a deletion operation on the one or more second data attributes mapped by the one or more first data attributes, removing a reference relationship of the one or more second data attributes based on reference relationship information of the one or more second data attributes in a case where the one or more second data attributes is referenced, and deleting the one or more second data attributes mapped by the one or more first data attributes in a case where the one or more second data attributes is not referenced.

11. The method according to claim 9, wherein the object editing interface further displays the related information corresponding to the one or more second data attributes.

12. The method according to claim 1, wherein the object editing interface is further used for displaying a non-reference list, and the non-reference list comprises at least one other first data attribute of the plurality of the first data attributes that does not have a mapping relationship with the one or more second data attributes, and the method further comprises:

updating the non-reference list based on a newly added first data attribute when detecting that there is the newly added first data attribute in the data source; and/or updating the non-reference list based on a reduced first data attribute in a case where there is no mapping relationship between the at least one other first data attribute and the one or more second data attributes when detecting that there is the reduced first data attribute in the data source; and/or in response to an operation on the at least one other first data attribute in the non-reference list, adding the at least one other first data attribute to the reference list, and configuring the one or more second data attributes of the external object corresponding to the at least one other first data attribute, so that the at least one other first data attribute in the reference list is transformed into the one or more second data attributes which has the mapping relationship with the at least one other first data attribute.

13. The method according to claim 1, further comprising:

displaying a prompt message with an object editing interface portal when detecting that there one is a changed first data attribute in the data source and in a case where the changed first data attribute contains a first data attribute with which the one or more second data attributes has the mapping relationship, wherein the prompt message is used for prompting that the data source is changed;

displaying the object editing interface in response to an operation on the object editing interface portal; and deleting the one or more second data attributes mapped by the changed first data attribute in the object editing interface, wherein the at least one second data attribute mapped by the changed first data attribute has invalidation indication information for indicating that the mapping relationship between the one or more second data attributes and the first data attribute is invalid.

14. The method according to claim 1, further comprising:

in response to a deletion operation on the one or more second data attributes mapped by the one or more first data attributes, removing a reference relationship of the one or more second data attributes based on reference relationship information of the one or more second data attributes in a case where the one or more second data attributes is referenced, and deleting the one or more second data attributes mapped by the one or more first data attributes in a case where the one or more second data attributes is not referenced.

15. The method according to claim 14, wherein removing the reference relationship of the one or more second data attributes based on the reference relationship information of the one or more second data attributes comprises:

displaying the reference relationship information of the one or more second data attributes, wherein the reference relationship information at least comprises reference indication information and a reference editing interface portal, and the reference indication information is used for indicating module description information that references the one or more second data attributes;

displaying a module editing interface referencing the one or more second data attributes in response to an operation on the reference editing interface portal; and deleting the one or more second data attributes in the module editing interface.

16. A method for integrating data using a data integration platform, comprising:

generating request parameters of a data query request associated with an external object based on a mapping relationship between one or more second data attributes of a data structure of the external object and one or more of a first plurality of data attributes of a data structure of a data source, wherein the parameters comply with requirements of a common protocol, wherein the external object is created by the data integration platform based on the data structure of the data source, and wherein the mapping relationship is edited in response to input associated with a reference list displayed on an object editing interface, wherein the object editing interface displays the reference list and related information of the external object, wherein the reference list comprises a list of the one or more second data attributes having the mapping relationship with the one or more first data attributes;

requesting the data source to return the data by the data integration platform based on an access credential of the data source being verified and the request parameters; and displaying the data returned from the data source by the data integration platform in the data structure of the external object based on the mapping relationship between the data structure of the external object and the data structure of the data source.

17. A configuration apparatus for a data integration strategy, comprising:

an obtaining module, used for reading a data structure of a data source by a data integration platform based on an access credential for accessing the data source being verified, wherein input indicative of the access credential is received by the data integration platform; and a configuring module, used for creating an external object based on the data structure of the data source, wherein a data structure of the external object comprises one or more second data attributes and corresponds to the data structure of the data source, wherein there is a mapping relationship between the one or more second data attributes and one or more of a first plurality of data attributes of the data structure of the data source, and wherein the mapping relationship is edited in response to input associated with a reference list displayed on an object editing interface, wherein the object editing interface displays the reference list and related information of the external object, wherein the reference list comprises a list of the one or more second data attributes having the mapping relationship with the one or more first data attributes; and wherein the data integration platform is configured to obtain data from the data source based on the mapping relationship between the data structure of the external object and the data structure of the data source, and wherein the data integration platform is configured to display the data obtained from the data source in accordance with the data structure of the external object.

18. An electronic device, comprising:

a processor; and a memory for storing programs, wherein the programs comprise instructions which, when executed by the processor, cause the processor to perform the method according to claim 1.

19. A non-transitory computer-readable storage medium, wherein the non-transitory computer-readable storage medium stores computer instructions for causing a computer to execute the method according to claim 1.

* * * * *